Nov. 17, 1953   H. R. FREUND   2,659,282
METHOD FOR CORRECTION AND MAKE-UP OF TYPE MATTER
FOR PLANOGRAPHIC PRINTING PROCESSES
Filed Jan. 19, 1950   16 Sheets-Sheet 3
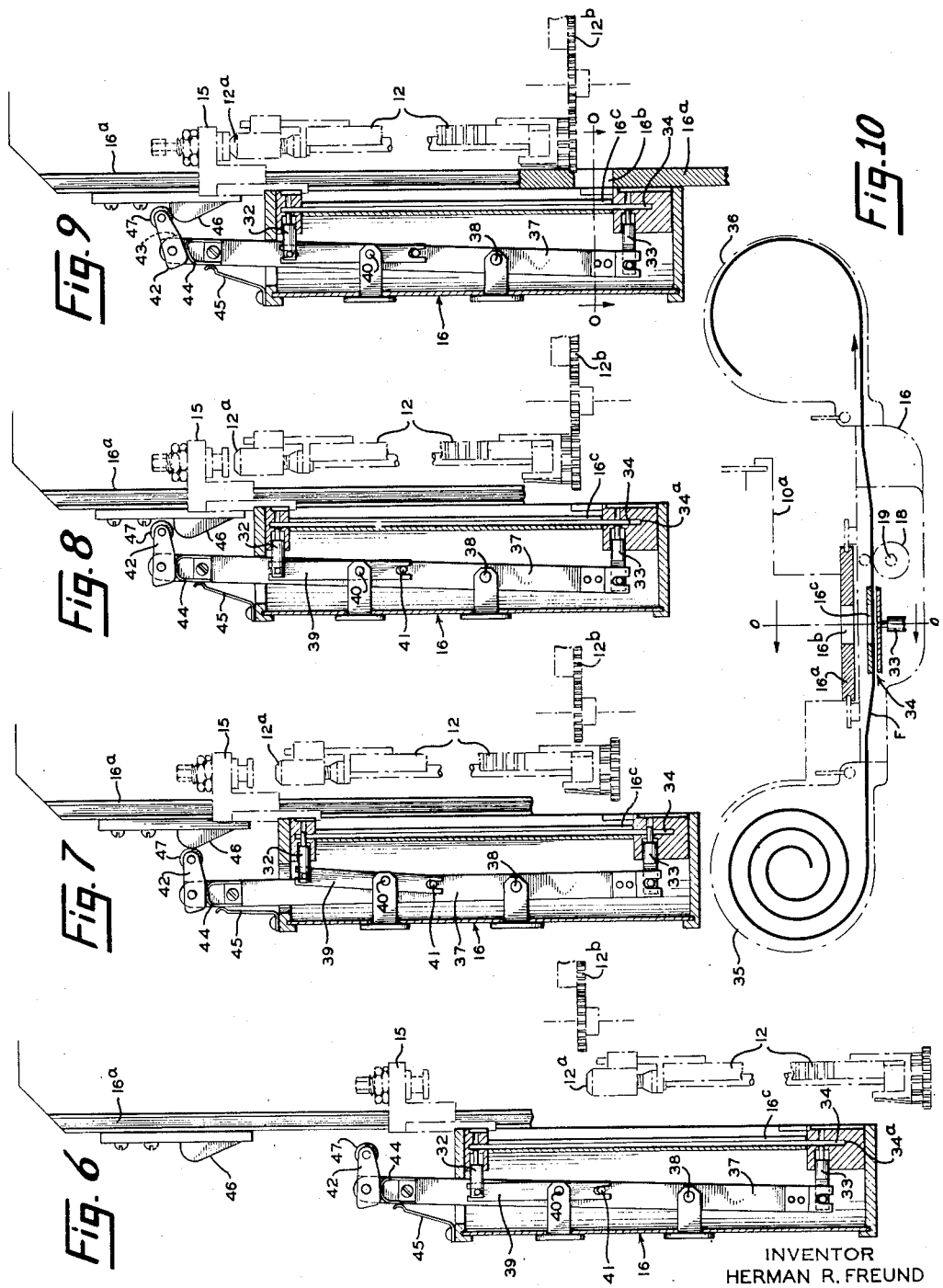
INVENTOR
HERMAN R. FREUND
BY
ATTORNEY

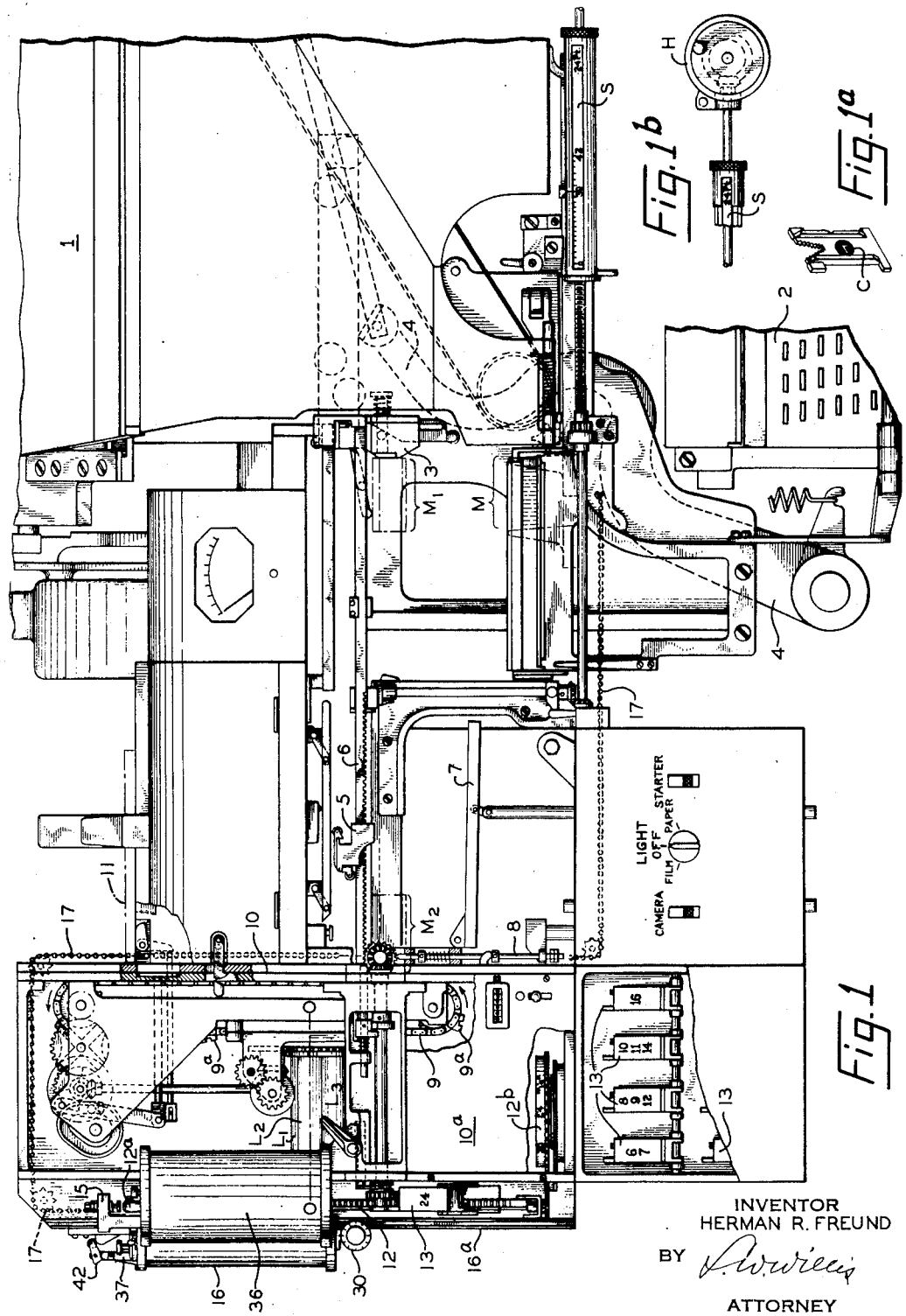

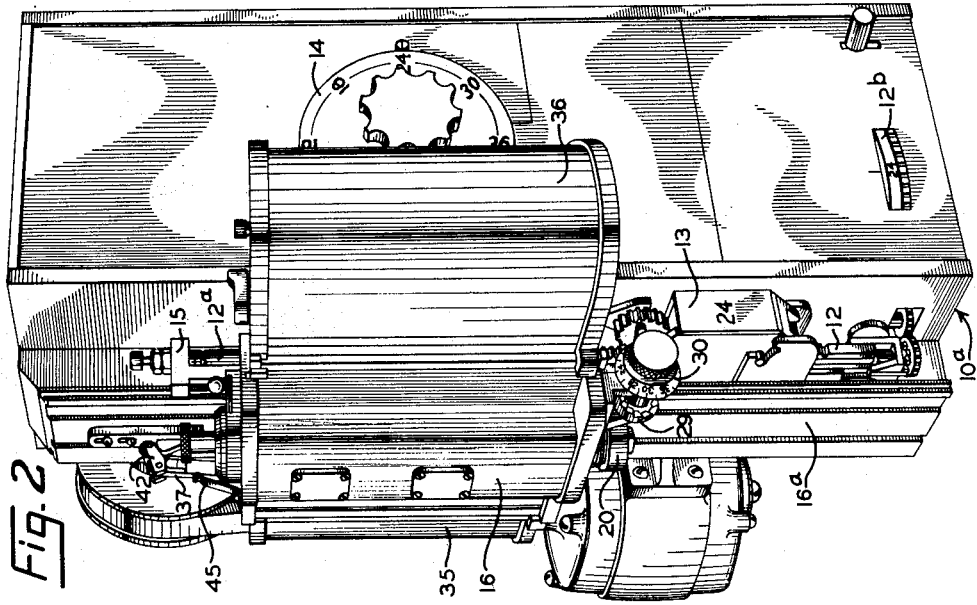
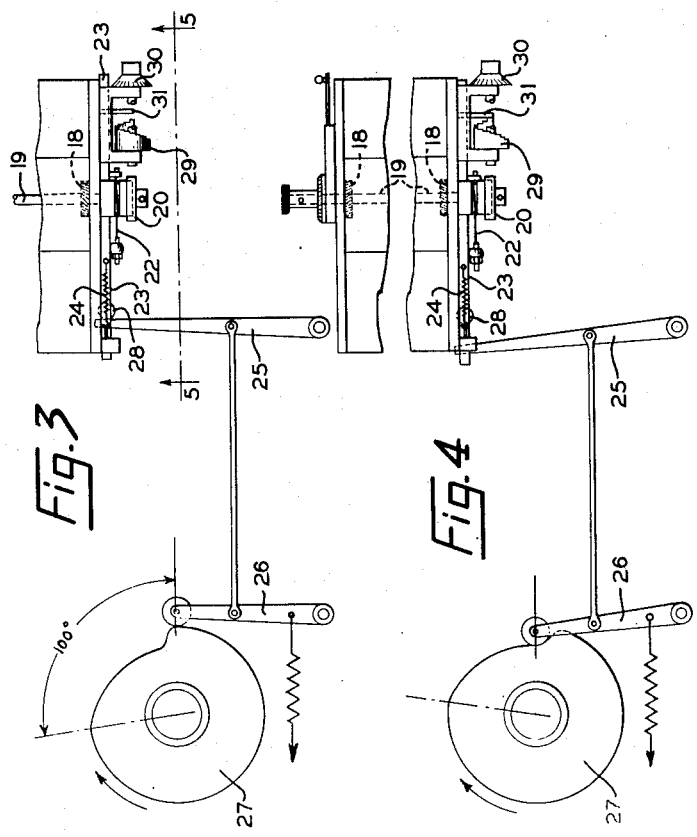
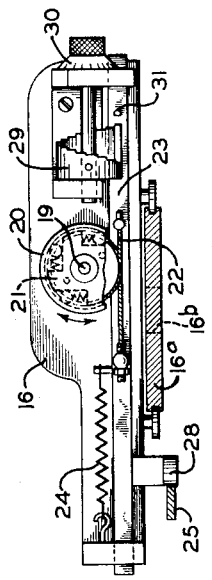

INVENTOR
HERMAN R. FREUND
BY
ATTORNEY

Nov. 17, 1953     H. R. FREUND     2,659,282
METHOD FOR CORRECTION AND MAKE-UP OF TYPE MATTER
FOR PLANOGRAPHIC PRINTING PROCESSES
Filed Jan. 19, 1950                              16 Sheets-Sheet 5
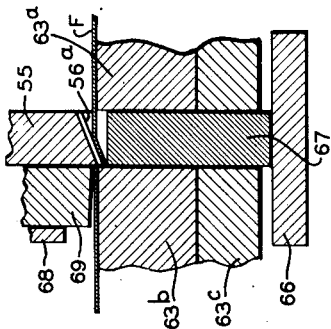
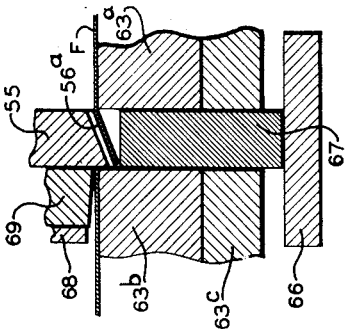
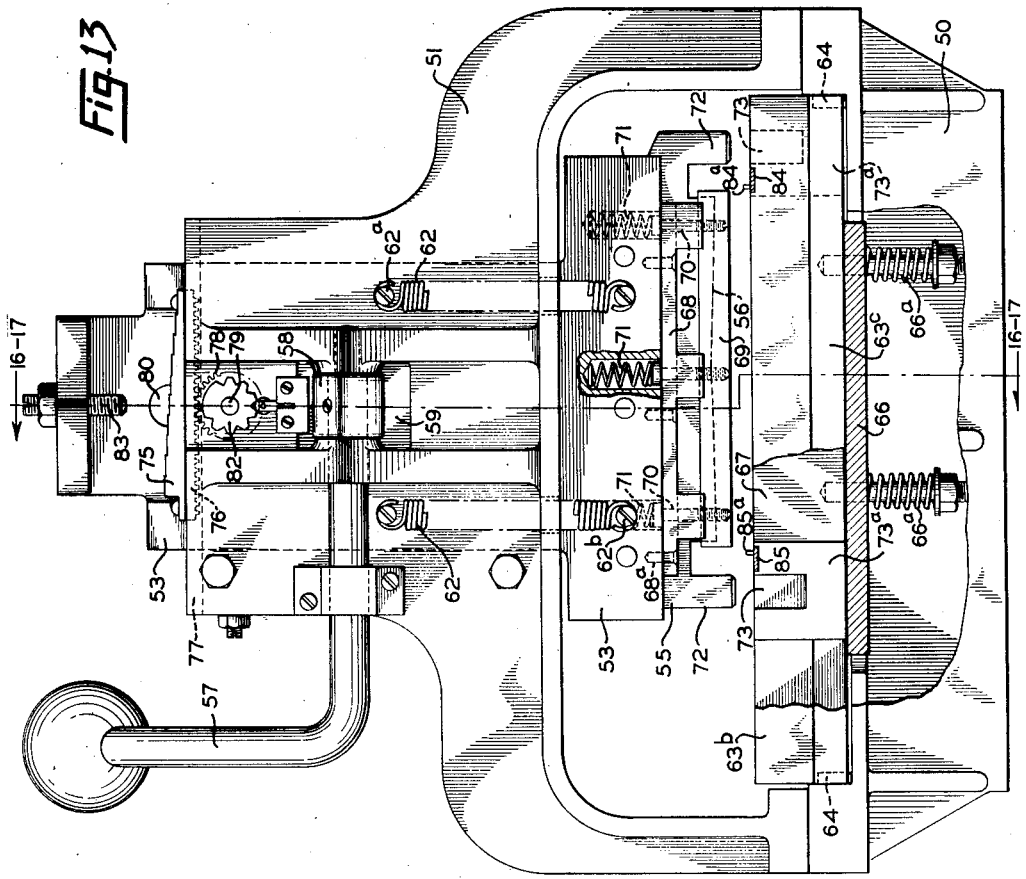
INVENTOR
HERMAN R. FREUND
BY
ATTORNEY

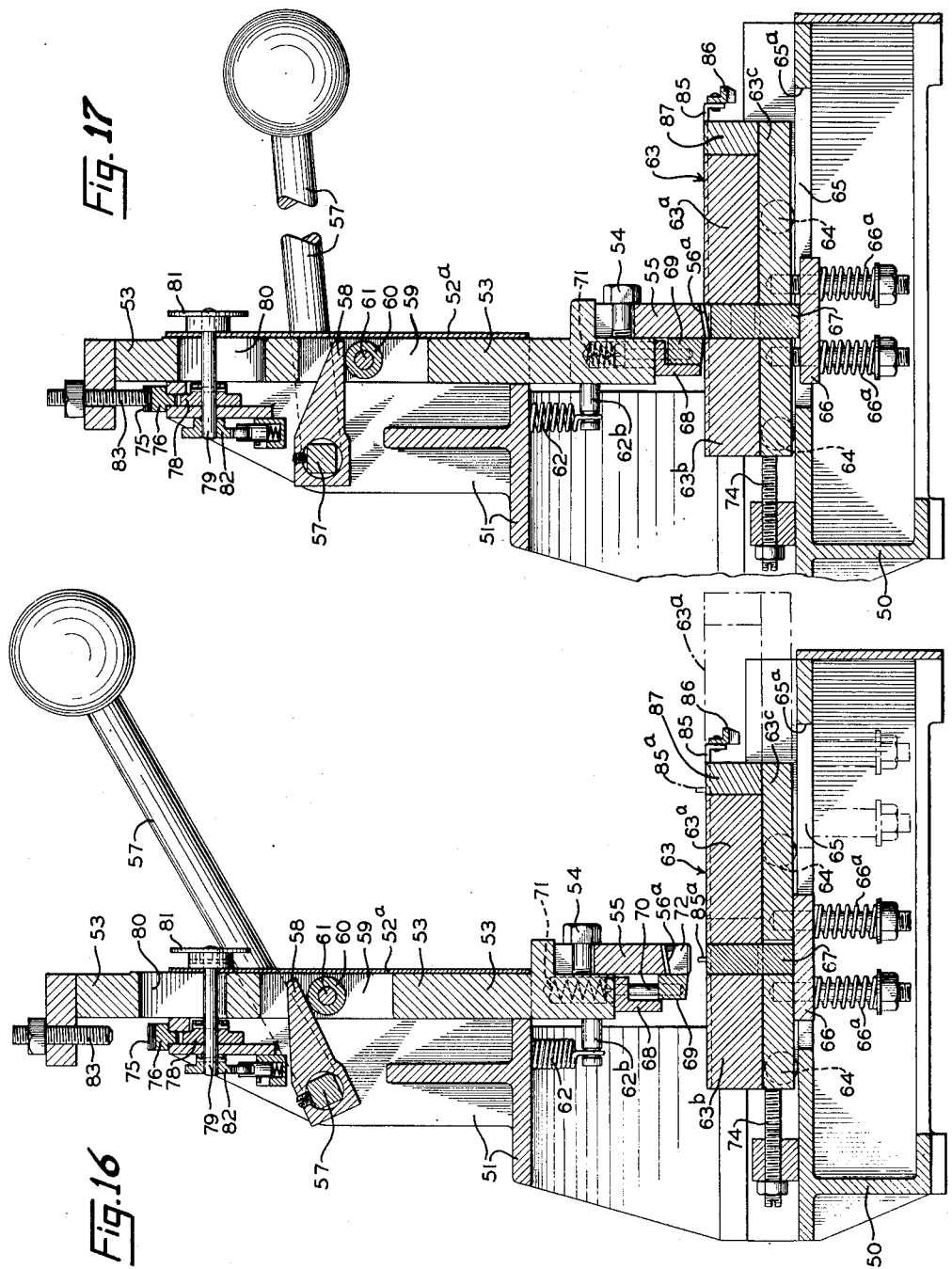

Nov. 17, 1953         H. R. FREUND         2,659,282
METHOD FOR CORRECTION AND MAKE-UP OF TYPE MATTER
FOR PLANOGRAPHIC PRINTING PROCESSES
Filed Jan. 19, 1950         16 Sheets-Sheet 7
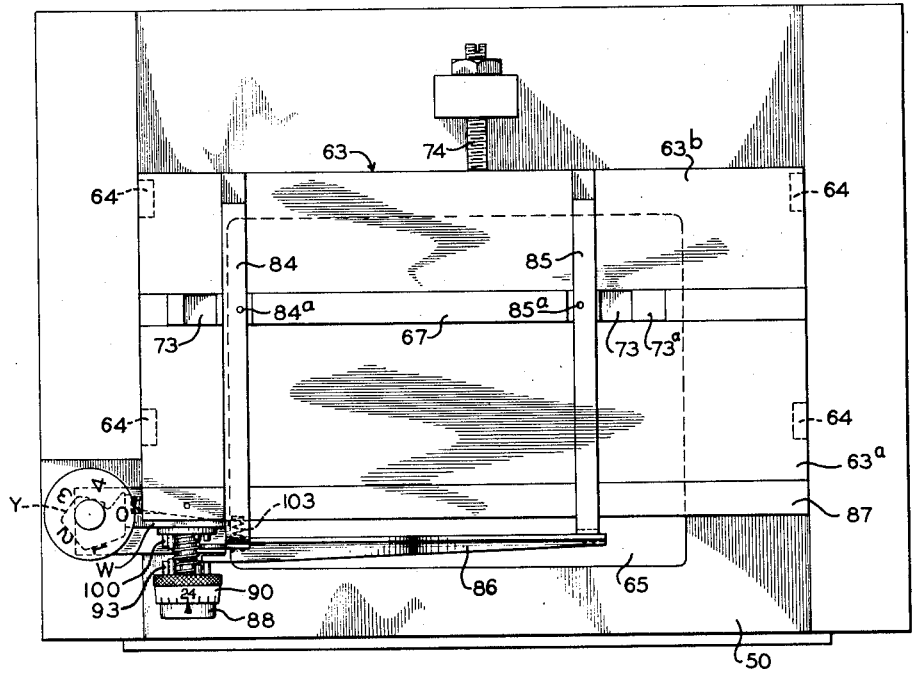
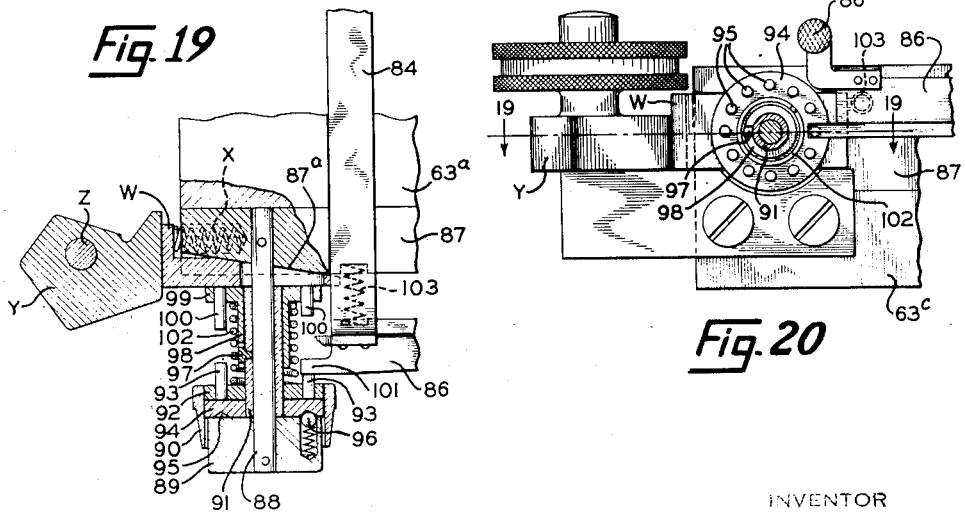
INVENTOR
HERMAN R. FREUND
ATTORNEY

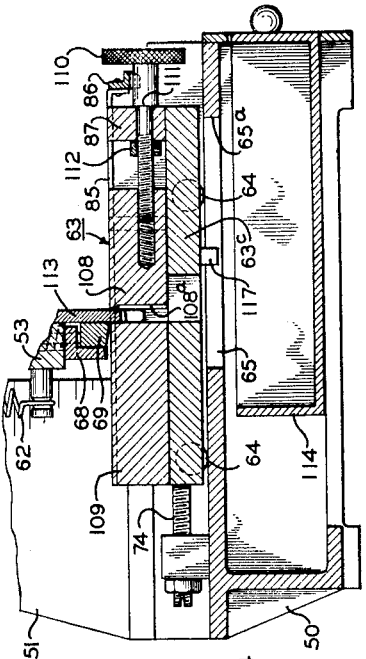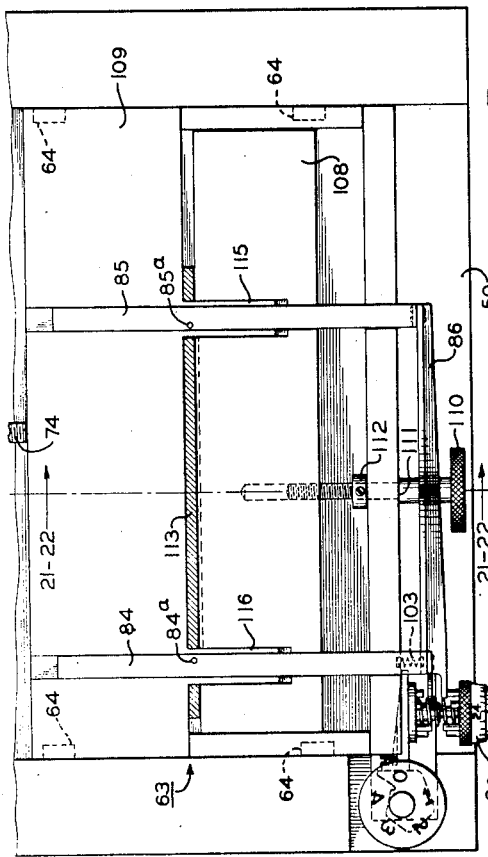

Nov. 17, 1953 H. R. FREUND 2,659,282
METHOD FOR CORRECTION AND MAKE-UP OF TYPE MATTER
FOR PLANOGRAPHIC PRINTING PROCESSES
Filed Jan. 19, 1950 16 Sheets-Sheet 9
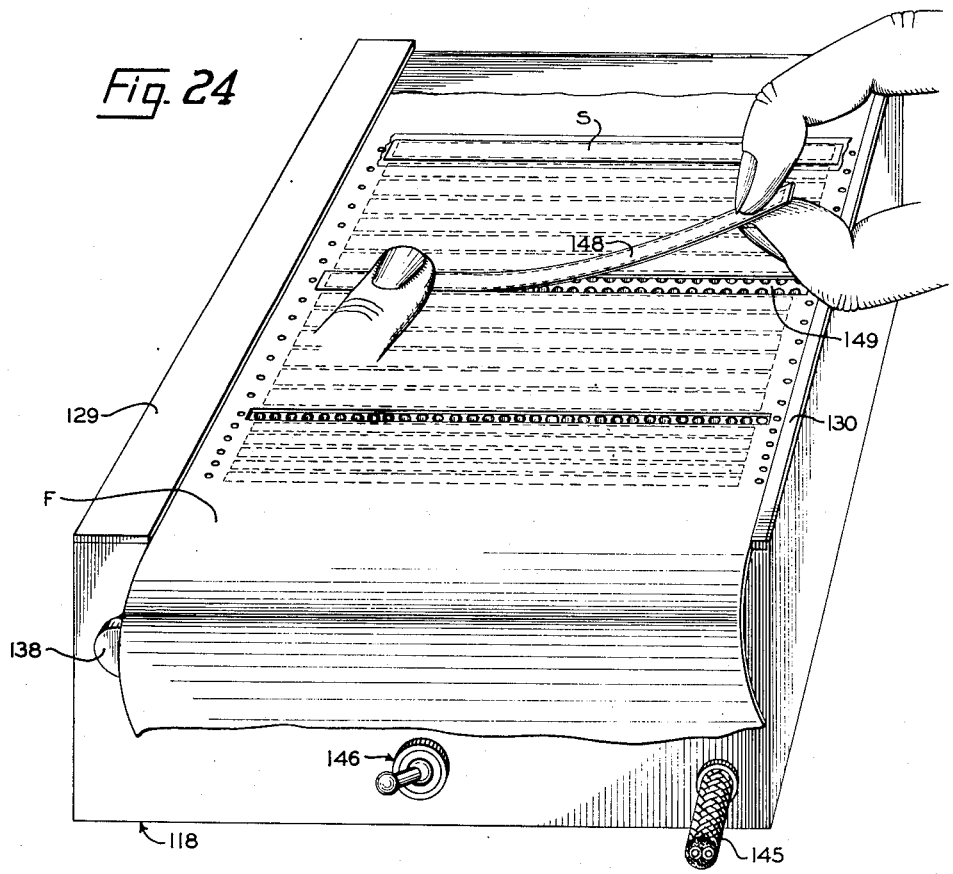
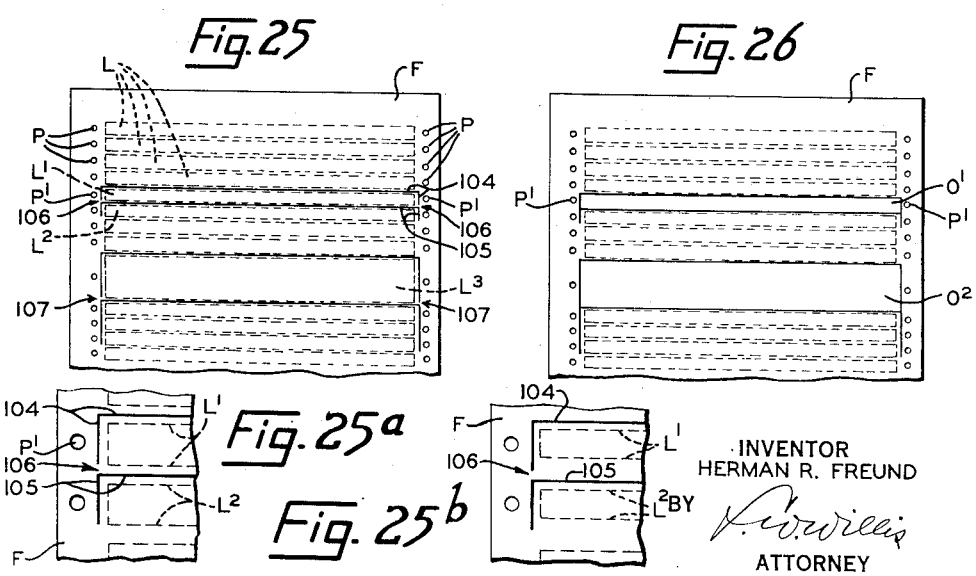
INVENTOR
HERMAN R. FREUND
ATTORNEY Nov. 17, 1953     H. R. FREUND     2,659,282
METHOD FOR CORRECTION AND MAKE-UP OF TYPE MATTER
FOR PLANOGRAPHIC PRINTING PROCESSES
Filed Jan. 19, 1950     16 Sheets-Sheet 10
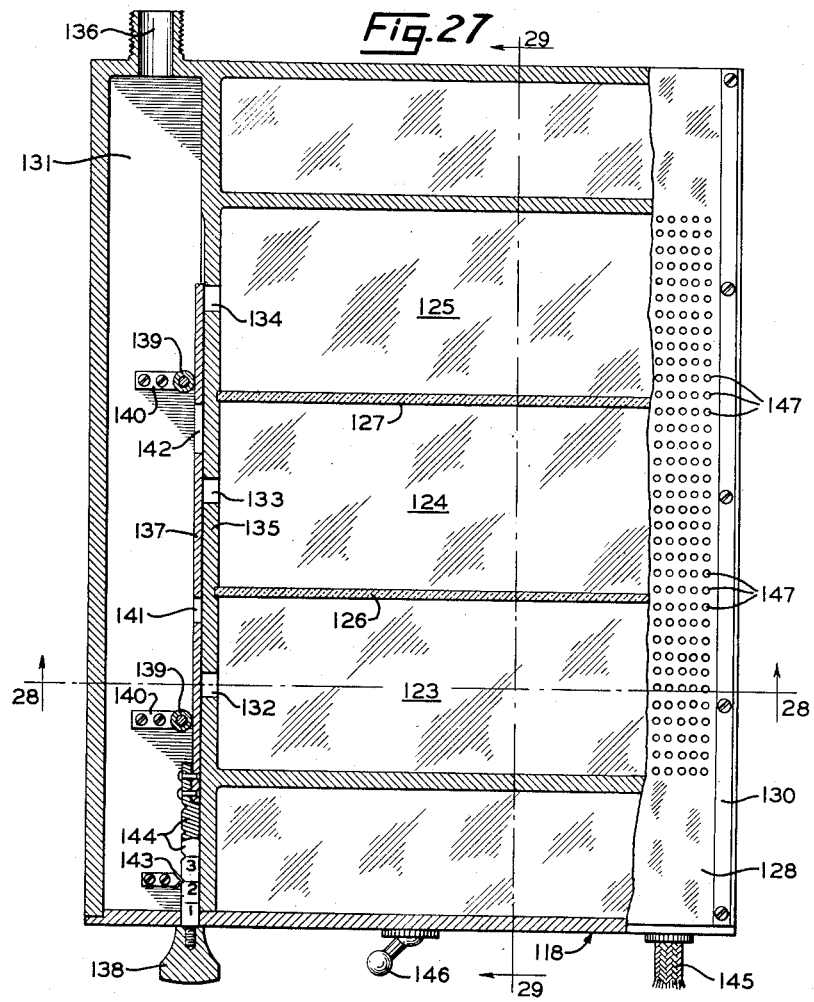
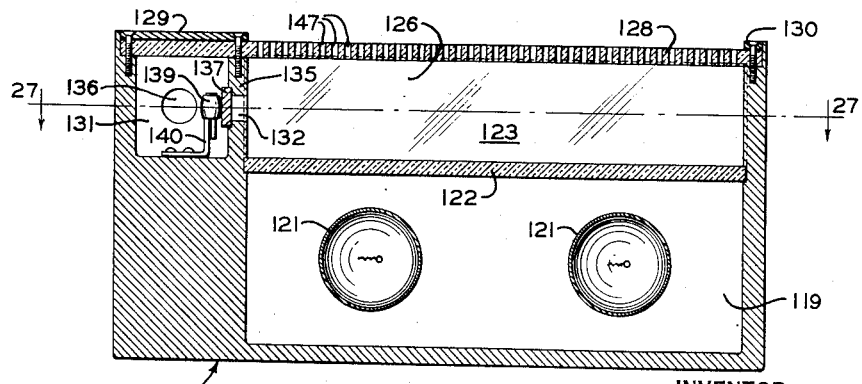
INVENTOR
HERMAN R. FREUND
BY
ATTORNEY Nov. 17, 1953 H. R. FREUND 2,659,282
METHOD FOR CORRECTION AND MAKE-UP OF TYPE MATTER
FOR PLANOGRAPHIC PRINTING PROCESSES
Filed Jan. 19, 1950 16 Sheets-Sheet 11
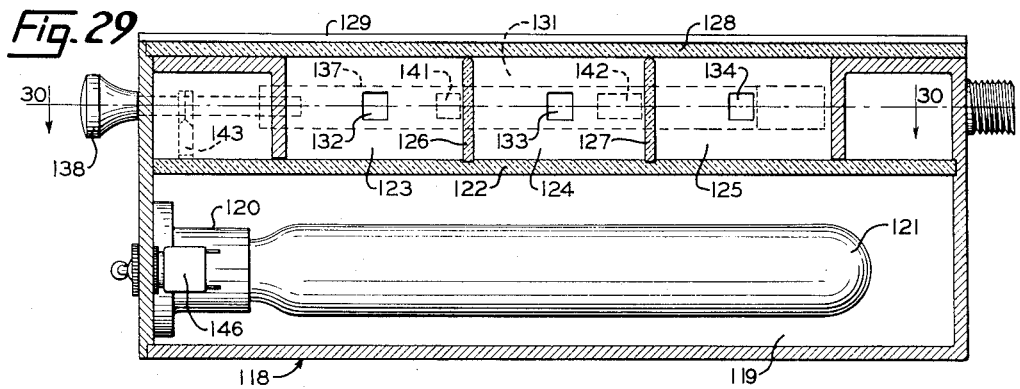
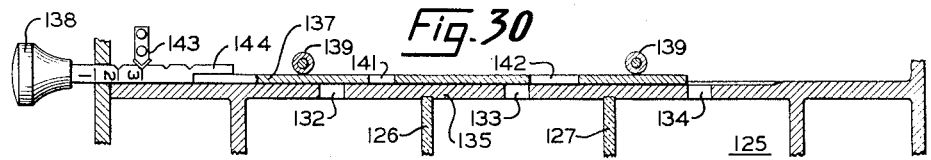
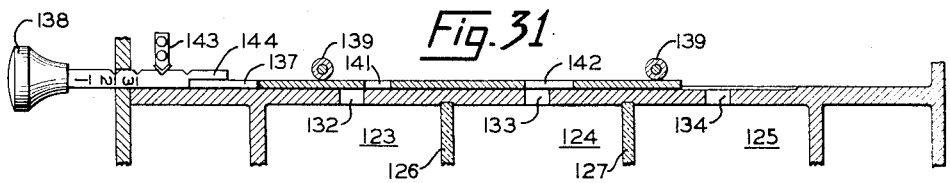
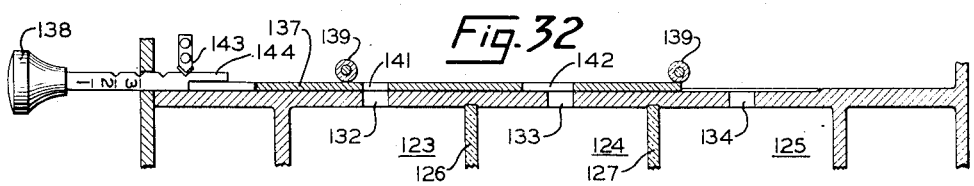
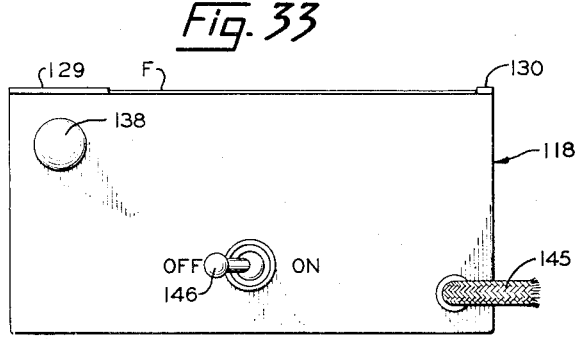
INVENTOR
HERMAN R. FREUND
BY
ATTORNEY

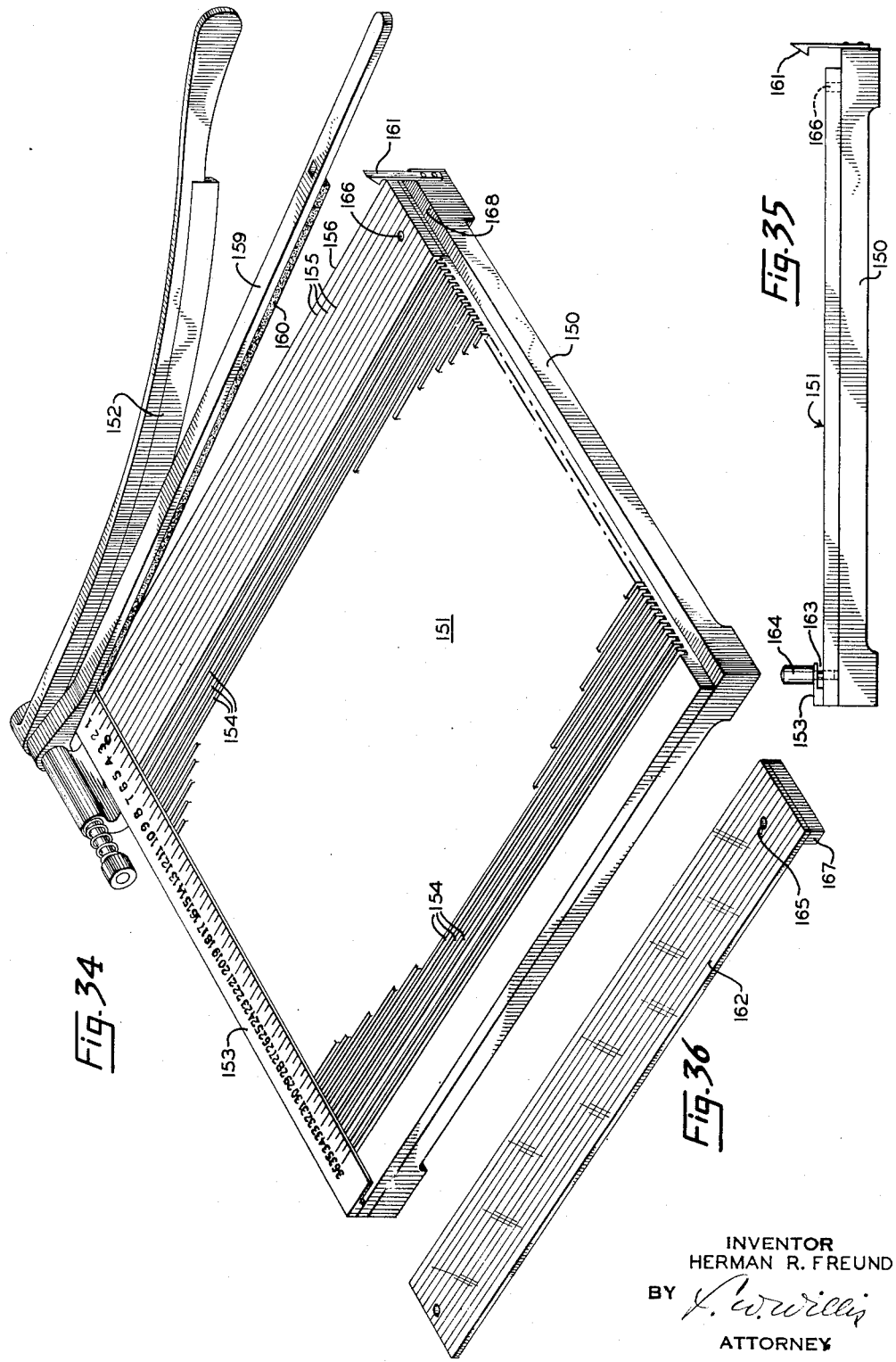

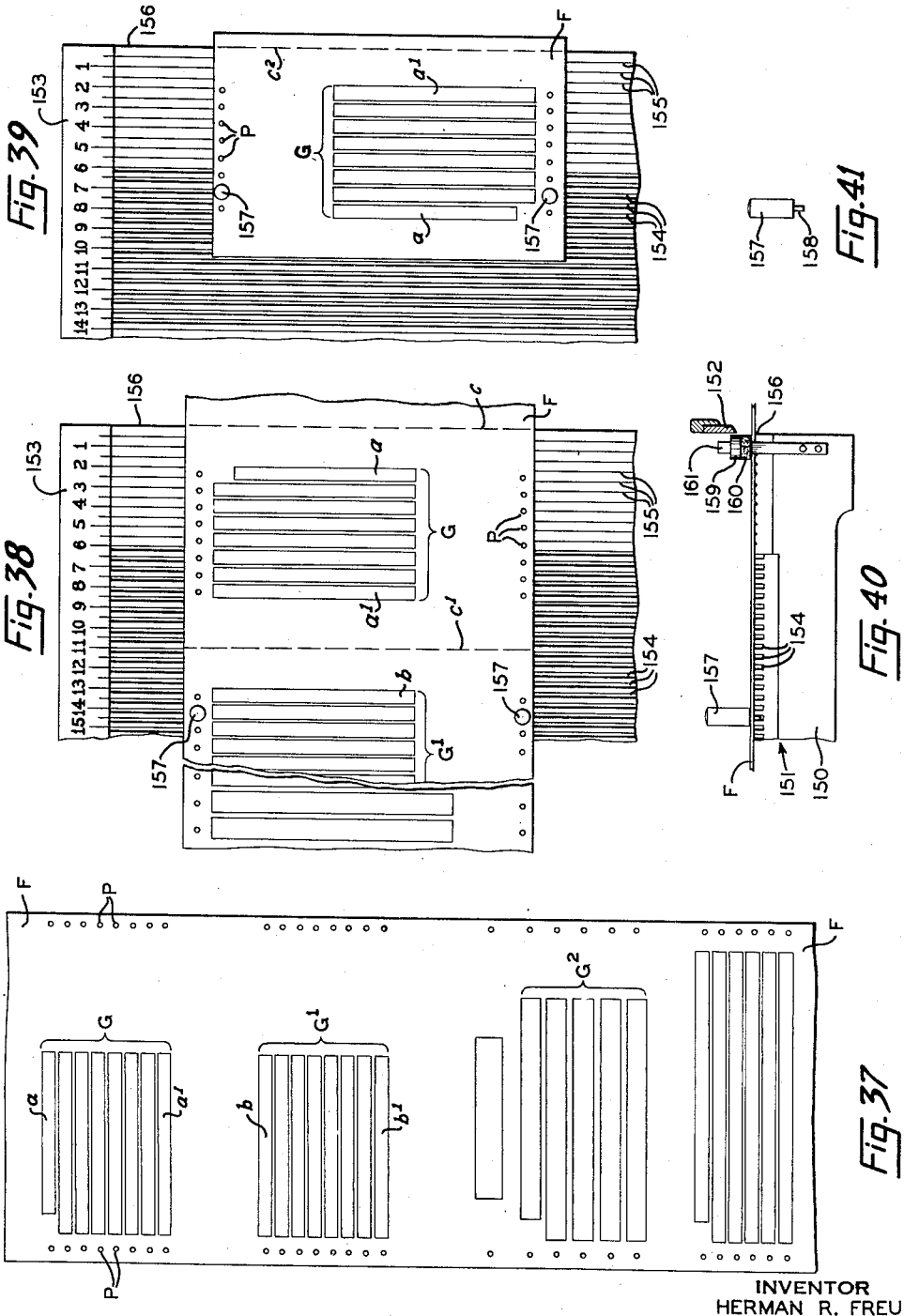

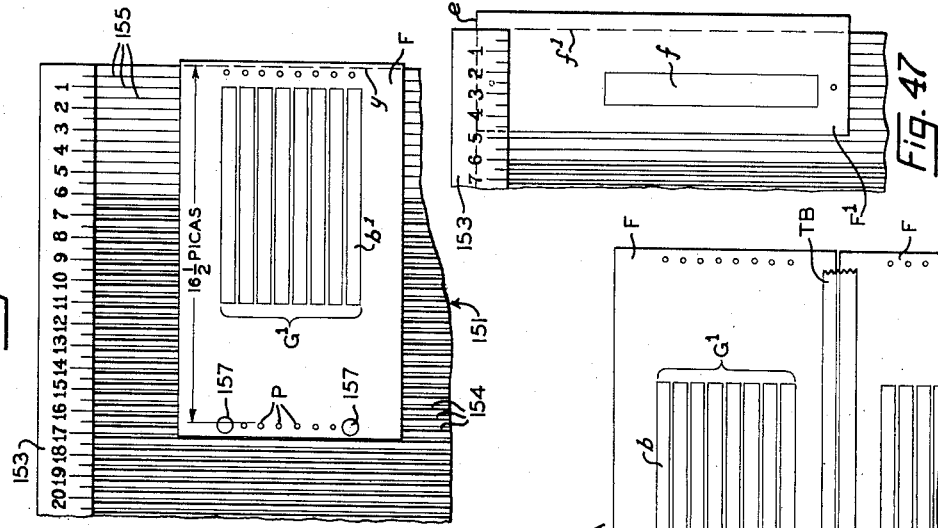

INVENTOR
HERMAN R. FREUND
BY
ATTORNEY

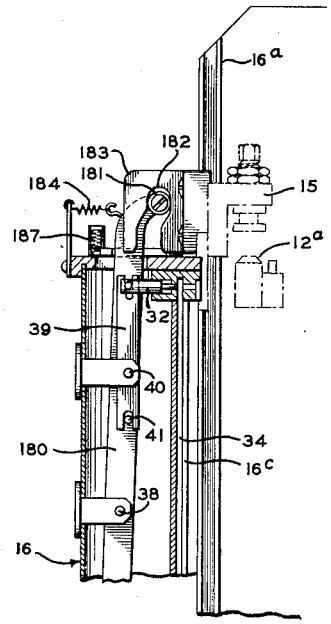
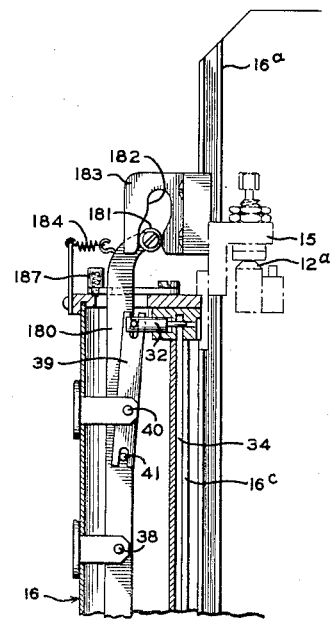
Fig.50  Fig.51
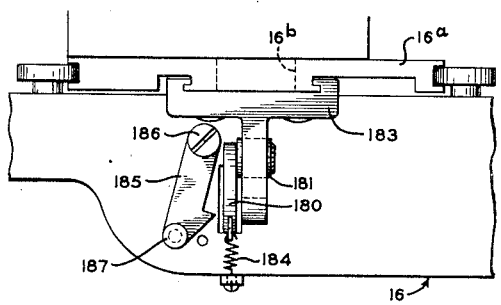
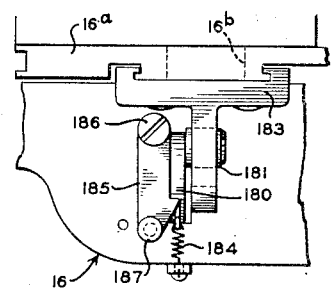
Fig.52  Fig.53

UNITED STATES PATENT OFFICE 2,659,282

METHOD FOR CORRECTION AND MAKE-UP OF TYPE MATTER FOR PLANOGRAPHIC PRINTING PROCESSES

Herman R. Freund, Brooklyn, N. Y., assignor to Intertype Corporation, Brooklyn, N. Y., a corporation of New York Application January 19, 1950, Serial No. 139,422

5 Claims. (Cl. 95—4.5)

This invention relates to the typographical art and more particularly to improvements useful in effecting corrections or alterations in type matter produced on sensitized film or paper, as in a photographic line-composing machine, and in subsequently effecting trimming, relative alignment and stripping together of units or blocks of type matter borne on different pieces of film or paper, thus to provide a composite "make-up" from which to obtain a reproduction proof and finally a planographic printing plate useful in offset and gravure printing processes.

More specifically, the invention relates to improved apparatus and procedure adapted to solve the difficult problem of executing "corrections" and "make-up" with the high degree of accuracy required in relative spacing, parallelism and alignment as between individual lines and columns thereof and between different units or blocks of type when associated together to form a composite sheet or page. According to known proposals for solving correction and make-up problems, the procedures are not only slow, costly and technically inadequate to deal with type in different point sizes, but are susceptible to such uncontrollable errors as naturally arise from variations in judgment and degree of skill of the worker.

The solution provided by the present invention distinguishes from such prior proposals in that it eliminates the human element from all of the manipulations necessary in effecting corrections and make-up, the required accuracy being attained automatically in respect to type in the full range of type sizes commonly used and the procedures being rapid, flexible and economical throughout.

Among the objects of the invention are the following:

To provide mechanism operative to associate with each line of type at the time it is produced on an original or "primary" sheet of film or paper, physical indicia useful for aligning and locating purposes in subsequent correction, trimming and make-up operations, such indicia preferably being in the form of perforations made in the "primary" sheet toward the edges thereof and at the opposite ends of each line, and bearing a definite relationship to the line-starting margin and the "base-alignment" level of the respective lines.

To provide a line-strip punch adapted to utilize the aforesaid indicia to align relative to a shearing knife any faulty line required to be severed out of a "primary" sheet in order to replace it with a substitute corrected line, the latter being severed by the knife from a "secondary" sheet on which such line is produced with similar aligning indicia.

To provide a trimming board adapted to utilize the aforesaid indicia for locating and aligning purposes while cutting off and trimming portions of a sheet squarely and to such size and marginal dimensions as the customary make-up dummy may designate as appropriate for different lines or different blocks of type borne by the sheet.

To provide a make-up plate or table adapted to utilize the aforesaid indicia to relatively locate and align the type matter borne by different trimmed portions of a sheet while assembling and marginally aligning such portions into the composite page form required for the final step of preparing a printing plate.

Other objects are to provide auxiliary facilities such as a vacuum box having a transparent cover illuminated from beneath and useful in effecting rapid and accurate insertion and "stripping in" of corrected or substitute line-strips; a vacuum arrangement in association with the make-up plate or table for holding steady the several trimmed portions of a sheet while manipulating them into exact relative positions and stripping them together, and alternative arrangements for using the aforementioned line-strip punch either to partially or to fully sever faulty and correct line-strips from a sheet, regardless of the point-size of the type and the spacing between successive lines.

The foregoing and other objectives of the invention and the many advantages arising from the practice thereof will be best understood from the detailed description to follow in connection with the accompanying drawings, wherein:

Figure 1 is a partial front elevation of a photographic line-composing machine having a film holder provided with punches by which to produce the physical line-locating indicia or perforations necessary to carrying out the invention.

Figure 1ª is a perspective view on a reduced scale of a character-bearing element suited to the photographic reproduction of lines of type matter in the machine shown in Fig. 1.

Figure 1ᵇ is a detail showing a hand adjusting wheel that extends from the right end of the assembler slide scale drum seen at the lower right of Fig. 1.

Figure 2 is a perspective end elevation showing the camera unit at the left side of the machine of Fig. 1.

Figure 3 shows diagrammatically the mechanism associated with the film holder for advancing a sensitized sheet therein to different extents desired for spacing successive lines of photographic images.

Figure 4 is similar to Fig. 3 but shows the mechanism in operated position.

Figure 5 shows details of the sheet advancing mechanism as viewed from the bottom of the film holder.

Figures 6, 7, 8 and 9 are similar vertical sections through the film holder with the film supply and receiving cases removed, the sections being taken slightly to the right of the optical axis O—O as seen in Fig. 10 and the perforating punches of the invention being shown in the form thereof arranged to operate after completion of a line of exposures and before the sensitized sheet is advanced to receive a succeeding line of exposures.

Figure 10 is a schematic plan view in section through the film holder on the optical axis O—O of Figs. 1 and 9, showing a sheet of film threaded through the holder and extending from the film supply case past the exposure aperture and the perforating punches of the invention into the film receiving case.

Figure 11:
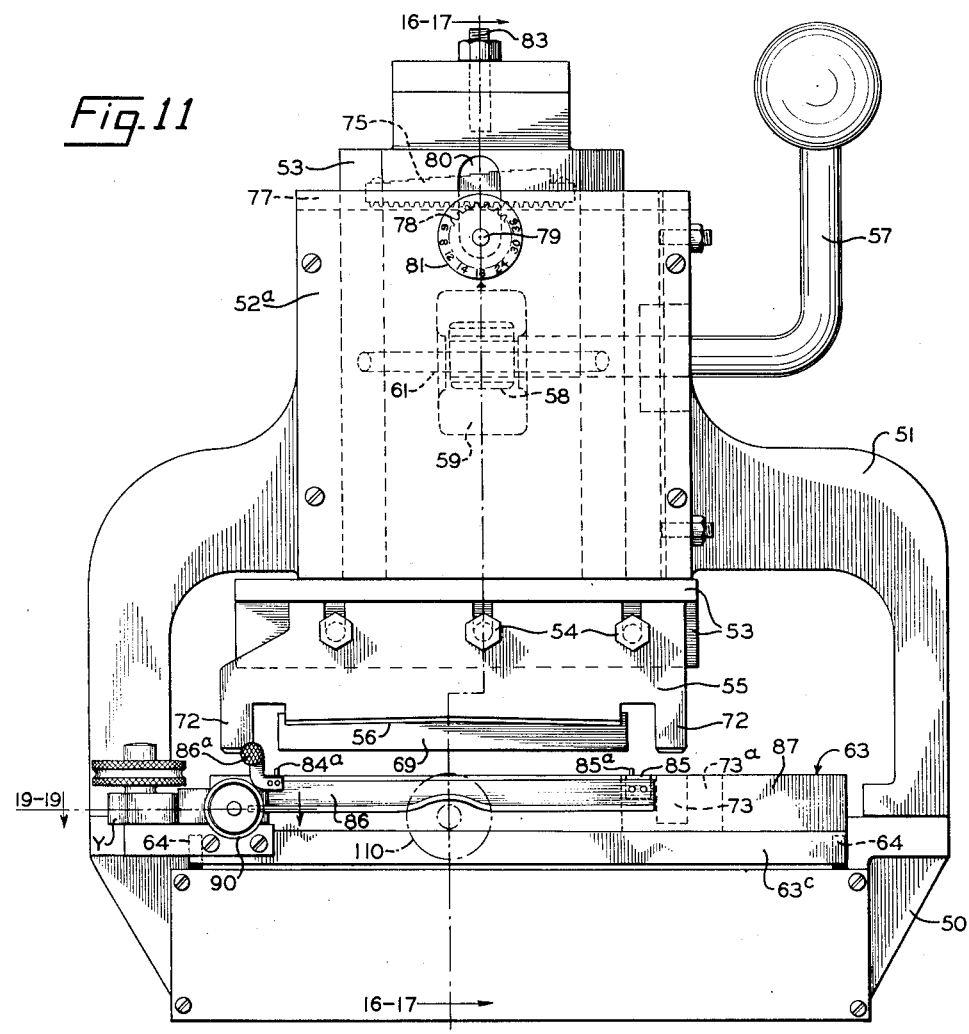

Figure 11 is a front elevation of the line-strip punch of the invention equipped with a universal shearing knife adapted to sever from a sheet of film or paper, in two operating strokes of the punch, line-strips bearing type in different point sizes.

Figure 12:
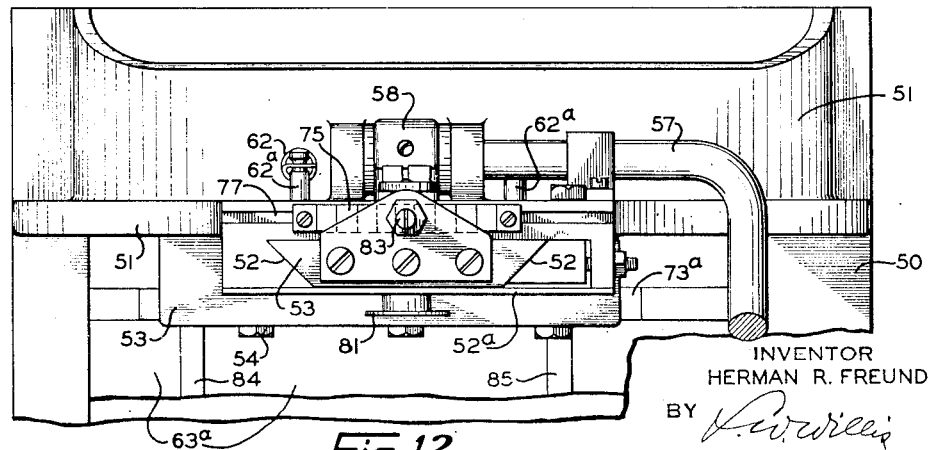

Figure 12 is a fragmentary plan view of the line-strip punch shown in Fig. 11.

Figure 13 is a rear elevation of the line-strip punch shown in Fig. 11.

Figures 14 and 15 are fragmentary sectional views showing the action of the universal shearing knife on a piece of film upon penetrating the die-bed of the punch to different depths.

Figures 16 and 17 are vertical sections of the line-strip punch taken on the line 16—17 in Figs. 11 or 13; Fig. 16 showing the punch in idle position and Fig. 17 showing the punch in operated position.

Figure 18 is a plan view showing the die-bed of the line-strip punch and parts associated therewith for determining the position relative to the shearing knife of lines in different type sizes.

Figure 19 is a fragmentary view partly in section on the line 19 in Fig. 11, showing in detail the mechanism by which a sheet of film or paper is shifted, between operating strokes of the line-strip punch, to shear above and then below a line of type.

Figure 20 is a fragmentary view in front elevation of the mechanism shown in Fig. 19.

Figures 21 and 22 are fragmentary vertical sections similar to Figs. 16 and 17, but show an alternative embodiment of the line-strip punch wherein exchangeable shearing knives each suited to a different point-size of type are employed and are adapted to completely sever out a line-strip by a single operating stroke of the punch.

Figure 22ª is a fragmentary view showing the opening left in a sheet after shearing out a line-strip by a knife according to the alternative embodiment of the punch shown in Figs. 21 and 22.

Figure 23 is a plan view similar to Fig. 18, but shows the die-bed of the punch as arranged according to the alternative embodiment of the punch shown in Figs. 21 and 22.

Figure 23ª is a diagrammatic view showing the relation of the perforations made in a sheet of film or paper to the line-starting margin and to the base aligning level of lines of type characters reproduced in different type sizes.

Figure 24 is a perspective view of an illuminated vacuum box provided by the invention for facilitating the insertion of corrected line-strips in a sheet of film or paper from which faulty line-strips are severed by the line-strip punch.

Figure 25 is a diagrammatic view showing a sheet bearing a series of lines of type and which has been sheared by the line-strip punch of Figs. 11 to 20 to produce removable strips bearing faulty lines.

Figure 25ª is a fragmentary view of a portion of the sheet shown in Fig. 25 and drawn on a greatly enlarged scale, whereby to more clearly show the relation between the cut-lines made in the sheet above, below and at the ends of a line of type by the line-strip punch of Figs. 11 to 20.

Figure 25ᵇ is similar to Fig. 25ª, but shows cut-lines such as produced in a sheet when the line-strip punch according to Figs. 11 to 20 is set to compensate for "leaded" line-spacing.

Figure 26 is similar to Fig. 25, but shows the rectangular openings left in a sheet after removal of line-strips sheared by the punch of Figs. 11 to 20.

Figure 27 shows in section on the line 27—27 in Fig. 28 the interior of the vacuum box shown in Fig. 24.

Figure 28 is a vertical section taken on the line 28—28 in Fig. 27.

Figure 29 is a vertical section taken on the line 29—29 in Fig. 27.

Figures 30, 31 and 32 are similar fragmentary sections taken on the line 30—30 in Fig. 29 and show the vacuum chamber control valve in different set positions, whereby to evacuate air from the different chambers of the vacuum box.

Figure 33 is a front elevation on a reduced scale of the vacuum box in Fig. 24.

Figure 34 is a perspective view of the trimming board of the invention by which the perforations made by the punches in the film holder are utilized to squarely trim from a sheet, with desired head and foot-space and also side margins, portions bearing different type lines or groups of lines.

Figure 35 is a side elevation viewed from the left edge of the trimming board in Fig. 34 but with the knife hinge and associated parts removed.

Figure 36 is a perspective view of an overlay member used with the trimming board when dealing with opaque film or paper.

Figure 37 shows a fragmentary sheet of film taken from the film holder 10 and developed and bearing several different groups of type matter.

Figure 38 shows a fragment of the trimming board with the film sheet of Fig. 37 located thereon for head-space trim above the first group of type on the sheet.

Figure 39 is similar to Fig. 38 but shows the first group of type on a film unit detached from the sheet of Fig. 37 and located on the trimming board for foot-space trim.

Figure 40 is a fragmentary elevation of the parts shown in Fig. 39.

Figure 41 shows an aligning pin adapted to cooperate with the perforations in a sheet or a detached unit thereof and with the trimming board, whereby to locate lines parallel and squarely relative to the knife while trimming to desired dimensions.

Figures 42 and 43 show film units detached from the sheet of Fig. 37 by using the trimming board in the manner shown in Figs. 38 and 39.

Figures 44 and 45 show the film units of Figs. 42 and 43 respectively located on the trimming board for side margin trim to desired dimensions.

Figure 48:
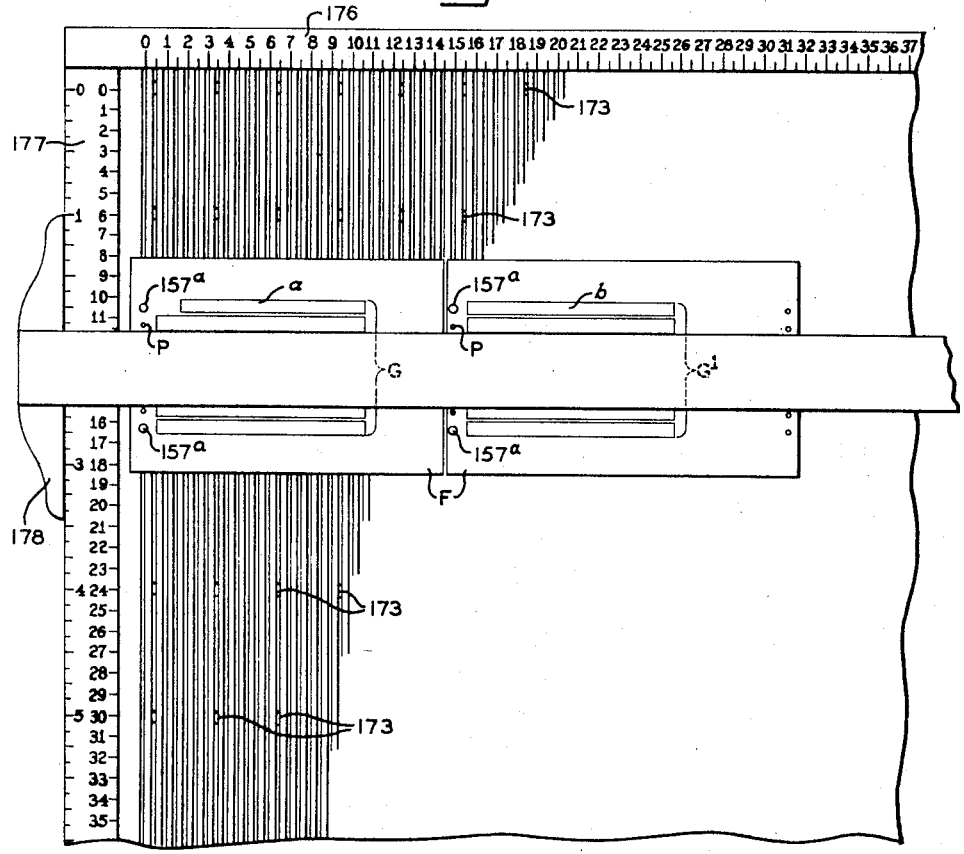

Figure 46 shows the marginally trimmed film units of Figs. 44 and 45 as they appear after make-up into a 2-column form through use of the make-up table of Fig. 48.

Figure 47 is similar to Fig. 39 but shows an alternative method of using the trimming board for foot-space trim, particularly when dealing with short lengths of film.

Figure 48 is a fragmentary plan view of the vacuum make-up table of the invention, and shows the marginally trimmed film units of Figs. 44 and 45 located on the table for desired column spacing and horizontal or cross alignment.

Figure 49:
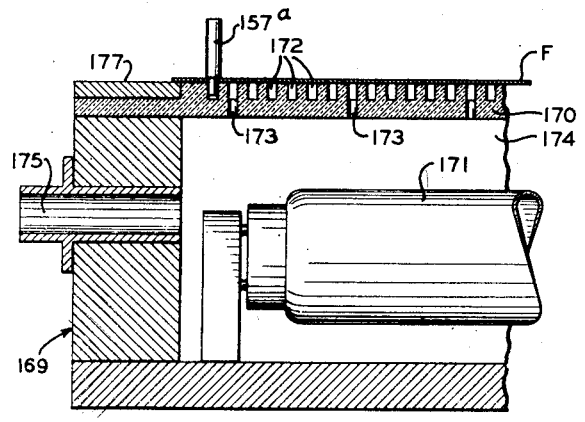

Figure 49 is an enlarged fragmentary front elevation, in section, showing details of the vacuum table in Fig. 48.

Figure 50 is similar to Fig. 8, but shows an alternative embodiment wherein the perforating punches in the film holder are arranged to operate before the start of each line of photographic exposures.

Figure 51 is similar to Fig. 50, but shows the perforating punches in operated position.

Figure 52 is an enlarged fragmentary plan view of the parts shown in Fig. 50, a latch for locking the punches against operation when the film holder is to be removed being shown in inactive position.

Figure 53 is similar to Fig. 52, but shows the film holder removed and the punches locked against operation.

For illustrative purposes and by way of example the invention is herein described in connection with type matter produced directly on sensitized film or paper in a photo-composing machine of the general organization shown in partial front elevation in Fig. 1. Such machine is described in detail in pending application Serial No. 94,766, filed May 23, 1949 (of which I am a co-inventor) and resembles in many respects the commercial line composing machines sold under the registered trade-mark "Intertype." For photographic composition, however, there is provided at the left side of the machine camera mechanism including a film holder which is movable step-by-step to receive projected images of type characters borne by individual elements or matrices of the form shown in Fig. 1a, each element bearing a master size character which may be optically enlarged or reduced to obtain reproductions in different sizes of type. It will be understood however that the invention applies to type matter produced in other kinds of photocomposing machines and with the aid of character-bearing members of any form suited to the purpose of obtaining reproduced lines of type.

The present invention is concerned primarily with the film holder of the photocomposing machine and in association with which there is provided mechanism for producing the beforementioned perforations which are intended to serve as physical indicia for aligning and locating purposes in correction, trimming and make-up operations. Accordingly, taking the photocomposing machine of the foregoing pending application as an example, it is deemed sufficient for present purposes merely to briefly review the manner in which composed lines of character-bearing elements are circulated through such machine and to outline the movements of the film holder and the film contained therein whereby lines of type matter produced thereon in different type sizes are marginally aligned and spaced columnwise. For more specific details of the construction and operation of the mechanism involved in performing these functions, reference is directed to the above identified co-pending application.

Referring to Fig. 1, photographic character-bearing elements (each having a recumbently disposed negative character on a film plaque C embedded in the body of the element) are released from the storage magazine 1 in response to operation of the keyboard 2 and composed into a line in familiar manner at the assembling station M. The length of the composed line is indicated on a scale S (of which there are several suited to different type sizes), a hand wheel H, Fig. 1b, being turned to set the scale endwise to the desired em-length marking. The composed line of elements is then raised to the delivery station M-1, whereupon the line-follower 3 is released and shifts the line leftward to the justifying station M-2, the follower 3 being connected in known manner to the familiar spring-urged delivery lever 4 whereby to effect such shifting of the line. At the station M-2 the line-follower 3 is stopped by and locks with the line-stop 5, the latter being locked at a pre-determined line-measure position along the line feed rack 6. After operation of justifying devices which include the pivoted rail 7 and co-acting line-length gauging members operated thereby and carried by the follower 3, the vertical bolt 8 is depressed whereby to release the locked-together parts 3, 5, and 6 and thus subject them to the leftward urge exerted by the delivery lever 4. The justifying devices referred to are described in detail in Patent No. 2,395,659 to which reference may be had if desired.

At this time a pair of unidirectionally driven feed chains 9 are started and spaced pick-up lugs 9a thereon operate to remove the elements singly and successively from the leading end of the line of elements at the station M-2, each removed element being moved upwardly in a feed channel formed in the vertical wall 10 of the camera housing 10a, first to a photographing position on the optical axis O—O and thence to a discharging position at the top of the feed channel. Here the successively arriving elements are pushed laterally to the right onto the familiar elevator 11, which operates to transport the accumlated line of elements to distributing mechanism (not shown) associated with the magazine 1.

After each removal of an element the remaining elements in the line thereof at the station M-2 are advanced bodily leftward (under the urge of the lever 4) a distance equal to the edgewise thickness of the removed element, the thickness of the elements varying in proportion to the setwise width of their respective photographable characters. The successive leftward advances after each removal of an element are transmitted by the feed rack 6 to the vertical rack 12 and converted to downward advances of the latter through the agency of suitable gear and shaft connections between the respective racks, such connections including a pre-selected fixed-ratio gear unit 13. A supply of exchangeable gear units 13 is contained in the storage case at the bottom of the camera housing 10a, each unit being provided with a gear-train suited to effect movement of the rack 12 in a different ratio relative to the rack 6. By selecting the proper unit the advances of the rack 12 are caused to harmonize with the enlarged or reduced size of the images projected by one or another fixed focus lens L-1, L-2, L-3, etc., provided on a turret turned by a dial 14, Fig. 2, to pre-select a desired lens.

The vertical rack 12 is provided with an adjustable headpiece 12ª on which freely rests an angle bracket 15 secured to the top of the light-tight film holder 16. In response to the concurrent step-by-step movements of the gear connected racks 6 and 12 as the elements are successively removed from the composed line thereof, the film holder descends by gravity to the extent necessary for proper set-wise spacing of the successive letter images projected in the particular point-size type, thus to form a line of images extending vertically across the film, that is, from the bottom toward the top edge thereof. As seen in Figs. 2, 5 and 10, the film holder 16 is guided in its up and down movements by rollers which engage in a trackway at each side of the rigid vertical plate 16ª. To maintain a common or uniform starting margin for lines in the different type sizes projected, the adjustable headpiece 12ª which determines the line-starting point of the film holder is set to the type size being projected, as indicated on the adjusting dial 12ᵇ, the holder partaking of an initial free drop onto the headpiece 12ª the moment the bolt 8 is depressed to release the feed rack 6 for feeding and photographing of the first element of the line.

Upon completion of a line of exposures the element feed chains 9 are stopped and the film holder 16 is elevated to restore it to starting position for the next line of exposures. Such restoration of the film holder is effected by a chain 17 connected to the top of the holder and extending over suitable sprockets to the delivery lever 4, the chain being slackened by swinging of the lever 4, leftward to deliver a composed line of elements to the station M-2, then partially taken up during descent of the film holder and removal of the successive elements for photographing, and finally being drawn taut to elevate the holder as the lever 4 swings to the right in returning to its starting position shown in Fig. 1. During its return stroke the lever 4, after it has partially elevated the film holder, operates to return the line-follower 3, the feed rack 6 and the vertical rack 12 to their starting positions shown in Fig. 1.

Upon full restoration of the film holder the mechanism shown in Figs. 2 to 5 operates to advance the film to the extent required for spacing the successive lines of photographic exposures. This mechanism comprises the finely milled film gripping discs 18 secured to the shaft 19 which is pinned at its lower end to the outer ring member 20 of the familiar type of slip clutch illustrated in Fig. 5. The arrangement is such that the clutch slips when its driving member 21, connected through the wire cord 22 to the endwise shiftable bar 23, turns in response to shifting of the bar to the left, but grips and turns the shaft and clutch ring 19, 20 whereby to advance the film when the bar 23 shifts to the right. The bar 23 shifts to the left, under tension of the spring 24, when the connected co-acting levers 25, 26 rock from the position shown in Fig. 3 to that shown in Fig. 4. Such rocking of the levers 25, 26 occurs in response to the depression in the contour of the cam 27 as the latter starts rotating through the last 100 degrees or thereabout to complete a cycle after restoration of the film holder. The gradual rise which immediately follows the depression in the cam 27 then rocks the levers 25, 26 from the position shown in Fig. 4 back to that shown in Fig. 3, the lever 25 engaging the stop 28 on the bar 23 and shifting the latter to the right, whereby the engaged clutch members 20, 21 operate to turn the shaft 19 and thus advance the film.

A stepped drum 29, pre-set by a dial 30 and cooperative with a pin 31 in the bar 23, limits the extent of shift of the bar to the left (in the slip direction of the clutch) and in consequence the extent of its return shift to the right for advancing the film. Ordinarily the drum 29 would be set in correspondence with the point-size of type indicated on the lens dial 14, but if it be desired to space successive lines further apart than normal for a given point-size of type, according to the well known practice of "leading-out" between lines to lengthen a column thereof, the drum 29 may be set to permit a correspondingly greater stroke of the bar 23.

*The film perforating mechanism*

According to the invention the mechanism for perforating a sheet of film or paper to provide the before-mentioned physical aligning and locating indicia comprises punches associated with the film holder of the photocomposing machine. Two embodiments of such punches are shown herein, the essential difference being in the timing of their operation. Thus, in the embodiment shown in Figs. 6 to 10, actuating means are provided for operating and immediately withdrawing the punches upon completion of each line of exposures and before the sensitized sheet is advanced to receive a succeeding line of exposures. In the embodiment shown in Figs. 50 to 53, actuating means are provided for operating the punches at the start of each new line of exposures and holding them engaged in the sheet until the line of exposures is completed, then withdrawing them to permit advance of the sheet to receive the next line of exposures.

Referring first to the embodiment shown in Figs. 6 to 10, there is arranged within the film holder 16 the upper and lower punches 32 and 33 respectively, these punches being disposed toward the opposite ends of the film passage 34 so as to perforate the film within its opposite edges. As best seen in Fig. 10, the punches align vertically with the optical projection axis O—O which passes centrally through the individual exposure aperture 16ᵇ in the film holder guide plate 16ª, the film holder casing having the vertically elongated aperture or window 16ᶜ through which the successive exposures are made in line across the film and in alignment with the optical axis as fresh areas of the film pass the aperture 16ᵇ during the step-by-step descents of the holder. Each punch is guided in a suitable fixed block for reciprocation laterally across the passage 34 through which the film travels from the rear or supply case 35 to the front or receiving case 36, these cases being detachably secured to the holder 16 for purposes of reloading and of removing exposed portions of film at any time. As indicated, the lower punch 33 is coupled to the lower end of a lever 37 which is pivoted at 38, and the upper punch 32 is coupled to the upper end of a lever 39, the latter being pivoted at 40 and coupled at its lower end to a cross pin 41 in the lever 37.

The forked end of a pawl 42 pivoted at the upper end of the lever 37 is provided at the base of the fork with a shoulder 43, best seen in Fig. 9, which banks against the inner or right hand edge of the lever 37 to prevent rocking of the pawl clockwise from a horizontal position, and a bow spring 44 serves to stabilize the pawl at such horizontal position. A flat spring 45 bearing against the outer edge of the lever 37 serves to urge the levers 37, 39 to the position shown in Figs. 6, 8 and 9 wherein the two punches 32, 33 are retracted clear of the film passage 34. A cam 46 secured to the film holder guide plate 16a lies in the path of a roller 47 disposed at the free end of the pawl 42.

The arrangement is such that with the film holder in its idle or restored position shown in Fig. 8, the roller 47 stands above and clear of the cam 46. As the holder descends, first to the marginal line-starting point determined by the setting of the headpiece 12a, see Fig. 9, then onward for exposure of the successively removed elements, the pawl 42 simply rocks anticlockwise and flexes the bow spring 44 as the roller 47 passes over the cam 46. Such rocking of the pawl 42 imparts no movement to the punch operating levers 37, 39, and once the roller 47 clears the cam 46 the bow spring 44 acts to restore the pawl to a horizontal position. However, when the roller 47 encounters and rides over the cam 46 during elevation or restoration of the film holder (somewhat in advance of elevation of the rack 12 and its headpiece 12a from the "line-end" position shown in Fig. 6) the pawl 42 is held rigid and horizontal by reason of its shoulder 43 bearing against the inner edge of the lever 37. In consequence the levers 37, 39 are simultaneously rocked in opposition to the spring 45 and reciprocate the punches 32, 33 across the film passage 34, see Fig. 7, whereby to perforate the film opposite the ends of the line of exposures just completed. As soon as the roller 47 clears the cam 46, upon full restoration of the film holder, the spring 45 reacts on the levers 37, 39 and operates to retract the punches to the normal position shown in Fig. 8. Fig. 25 and others show the perforations P made by the punches 32, 33 in association with a series of successively produced lines designated L and represented diagrammatically on a piece of film F. While the perforations shown are circular, it will be understood that one or both punches may be formed to produce square or rectangular perforations and that such alternative is wholly within the purview of the invention.

Among features of primary importance to be noted in connection with the perforating operation just described are the following:

First, the operation takes place automatically during elevation of the film holder and thus before the film is advanced for line-spacing purposes, such advance taking place only after the holder is fully restored. The significance of this is that perforations made before there is any movement whatever of the film relative to the punches and the optical projection axis across which the film moved to receive the successive exposures have an incontrovertibly accurate relationship to a longitudinal axis such as the horizontal base-line of the impressed line of images.

Second, regardless of the point-size of the projected images, the first image (denoting the marginal starting point of any line) is always spaced the same distance from the adjacent perforation, thus establishing a common or uniform left hand margin for lines in different type sizes. This highly important result arises from the fact that since the adjustable head-piece 12a is set to the type size being projected, the initial drop of the film holder onto this head-piece is such as to fix the line-starting point always at the same distance from the lower punch 33—the punch which is adjacent to the starting edge of the film. Fig. 23a illustrates the foregoing result wherein it will be observed that for the different size images made from a 12-point "master" size font of elements, the line-starting margin is uniform and at a constant distance from the adjacent perforations.

Third, the perforations are made in exact alignment with the optical projection axis and bear a definite relationship to the base-line or so-called "base alignment" BA, Fig. 23a, of the impressed line of images. However, such relationship changes when images are projected in other than a one-to-one ratio because, in the embodiment herein used for illustrative purposes, the base-line chosen for locating the characters on the elements of the "master" point-size font is not coincident with the optical center of the lens but is established at a level offset from such optical center (actually below it) by a predetermined amount. Accordingly, when optically enlarged or reduced images are projected, their base-line either recedes from or approaches the optical projection axis on which the punches are located in direct proportion to the degree of enlargement or reduction. Such condition would be obviated, of course, by establishing the base-line of the "master" characters at a level coincident with the optical center of the lens and it will be understood that such arrangement is wholly within the scope of the present invention.

The changing relation referred to above is shown in Fig. 23a wherein it will be seen that the distance $d$ from the perforations to the "base alignment" level BA of the lines of images enlarged from a 12-point "master" font is gradually greater than the distance $D$ for the 12-point line as the point-size of the images increases, and that for the reduced 9-point line the distance $d$ is somewhat less than the distance $D$ for the 12-point line.

In spite of this variable factor it remains that the perforations are related systematically and accurately to the horizontal base-line as well as the marginal line-starting point of lines of images projected in all different type sizes. Thus, a line drawn through the perforations at opposite ends of any reproduced line is exactly parallel to the base-line of the type images, and a line drawn through the perforations in a columnwise direction is exactly perpendicular to such base-line and parallel to the line-starting margin. Accordingly, the perforations provide a positive mechanical gauge by which to locate and align any line or group of lines both horizontally and vertically relative to the line-strip punch for making corrections and to the trimming board and the make-up instrumentalities of the invention, all as hereinafter described.

It may be pointed out here that mechanical gauging means formed and characterized as outlined above distinguishes from prior proposals aimed at similar ends, such prior proposals relying upon indicia in the form of markings or the like which are useful only through sighting against rulers or ruled backing boards, or employing markings made on a sheet by hand only after a whole column of lines have been produced theron. Such proposals obviously are time-consuming and costly and fail in consistency and accuracy to the extent of human variations in judgment, and for this and other reasons have been found commercially impracticable.

Turning to the embodiment of the punches as illustrated in Figs. 50 to 53, it will be seen by comparison with Fig. 8 that the essential difference lies in the actuating connections at the top of the film holder 16.

According to this embodiment the punches are operated to perforate the film before the start of each new line of exposures and remain engaged in the film until the line of exposures is completed and the film holder is returned to its normal "up" position, Fig. 50, whereupon the punches are withdrawn to permit the necessary line-space advance of the film. The principal advantage of this arrangement is that the punches engaged in the film during the downward and return movements of the holder positively anchor the film against any possible movement or creeping such as might arise, for example, from vibration during its rapid step-by-step descents between successive exposures.

To actuate the punches in the foregoing manner the lever 37, Fig. 8, which is pivoted at 38 and operates the lower punch 33 is replaced by the similar purpose lever 180 also pivoted at 38. As shown, the lever 180 is offset at its upper end where it is provided with a roller 181, the latter being adapted to cooperate with a box cam 182 formed in a bracket 183 which is suitably secured to the film holder guide plate 16ª. A spring 184 urges the lever 180 anti-clockwise.

The arrangement is such that when the film holder is in its normal "up" position as in Fig. 50, engagement of the roller 181 in the upper end of the box cam 182 rocks the lever 180 and by it the lever 39, against the tension of spring 184, to positions in which the punches 32 and 33 are held retracted clear of the film passage 34. However, when the film holder is released and drops freely to the line-starting position determined by the setting of the head-piece 12ª, all as previously described, the offset form of the box cam 182 rocks the lever 181 anti-clockwise which in turn rocks the lever 39 clockwise to the positions shown in Fig. 50. As evident, such rocking of these levers drives the punches 32 and 33 across the film passage 34 to perforate the film therein.

The spring 184 now serves to hold the punches engaged in the film as the holder descends to complete a line of exposures and until, toward the end of the return movement of the holder to its normal position shown in Fig. 50, the box cam 182 acting on the lever 180 rocks the latter and the lever 39 to a position for retracting the punches.

When for any reason it is desired to remove the film holder from the machine, such may be done by removing the cam bracket 183 (or the bracket carrying the punch actuating cam 46 of Fig. 8), then sliding the holder upward off the upper end of the guide plate 16ª. However, since removal of the cam bracket 183 would obviously free the punches for operation by the spring 184, there is provided a manual locking latch 185 as best seen in Figs. 52 and 53. This latch is pivoted at 186 and provided at its free end with a spring and ball detent 187 adapted to hold it normally in the inactive position shown in Fig. 52. If the film holder is to be removed the latch is moved to the position shown in Fig. 53 where it hooks behind the lever 180 and thus holds the latter and in turn the punches against operation by the spring 184. Of course if no film is in the holder at the time it is to be removed the latch 185 need not be used, but in the presence of film at such time the latch not only prevents unnecessary action of the punches but avoids the possibility that the spring 184 may not drive them through the film. The punches would then merely press against the film and any attempt thereafter to advance it by hand after removing the holder might result in scratching or other damage.

*The "line-strip" punch for executing corrections*

According to the invention there is provided a "line-strip" punch which is adapted to utilize the foregoing perforations to locate and align, relative to a shearing knife, any faulty lines required to be severed out of a developed original or "primary" sheet of film or paper taken from the film holder 16, whereby to replace such lines with corrected lines severed by the punch from a "secondary" sheet, by utilizing similar perforations made in such sheet for each corrected line prepared thereon in the film holder.

In one of its embodiments, as shown in Figs. 11 to 20, the punch is adapted to produce a removable line-strip in two operating strokes, one to shear above and the other to shear below the type characters in any line to be severed out of a sheet. To this end there is provided a shearing knife which is universal, that is, it may be used to shear from the sheet line-strips bearing type in sizes ranging from 4 to 36 points. For this purpose the bottom face of the knife is tapered upwardly and forwardly from its rear longitudinal cutting edge so that in penetrating the die of the punch the ends of the knife produce lateral cuts of different lengths sheared squarely and forwardly from the cut made by its rear edge. By means of an adjustable gauge which limits the depth to which the knife penetrates the die the lateral end cuts of the knife are made consistent in length with the point size of the type in any line it may be desired to obtain on a sheared-out strip.

In an alternative embodiment, as hereinafter described with reference to Figs. 21 to 23, the punch is adapted to sever out a line-strip in a single operating stroke. To this end the punch is provided with exchangeable knives each of a fixed thickness, such knives being suited alone or in selected pairs to the point-size of the type in any given line.

In both embodiments of the punch the basic structure is substantially the same, the principal difference being in the arrangement of the die-bed and knives.

*The two-stroke punch*

Turning first to the two-stroke punch employing the aforesaid universal knife, and with reference to Figs. 11 to 20, it comprises a supporting base 50 to which is secured an upstanding yoke-like frame 51, the latter being provided with dovetail guides 52, Fig. 12, for accommodating a knife holder 53 which is slidable vertically in such guides and is confined by a cover plate 52ª. Secured to the lower end of the holder 53, as by bolts 54, is the shearing knife 55 the rear longitudinal cutting edge 56 of which is tapered, see Figs. 11 and 13, so as to shear from opposite ends toward the middle. As already stated, the bottom face of the knife is tapered upwardly from its rear cutting edge 56 toward its front edge, whereby upon each operating stroke of the punch the cutting ends 56ᵃ of the knife (Figs. 14 to 17) produce lateral cuts sheared squarely and forwardly from the longitudinal cut made by the rear cutting edge.

For operating the punch there is provided an offset hand lever 57 journaled in suitable bearings at the back of the upright frame 51 and having secured thereto an operating arm 58. The arm 58 extends forwardly through an aperture 59 in the knife holder 53 and cooperates with a roller 60 on a shaft 61 which spans the aperture 59. A pair of springs 63 hooked over pins 62ᵃ in the frame 51 and over pins 62ᵇ in the knife holder 53 urge the latter to the inactive or "up" position shown in Figs. 11, 13 and 16. At such position the knife 55 stands clear of the sheet supporting die carriage 63 of the punch, this carriage being provided with rollers 64 whereby it may be moved fore-and-aft on the base 50.

The carriage 63 comprises front and rear die plates 63ᵃ, 63ᵇ which are secured to a bed plate 63ᶜ in such spaced relation as to provide between them an elongated die slot for accommodating the knife 55 when the punch is operated, see Fig. 17. A rectangular opening 65 in the base 50 provides clearance for an elongated plate 66 which underlies the die slot of the carriage and is urged upwardly against the bed plate 63ᶜ by springs 66ᵃ encircling bolts threaded into the bottom of the bed plate. A stripper bar 67 disposed edgewise in the die slot and extending downwardly through a similar cross slot in the bed plate 63ᶜ rests on the upper face of the plate 66 with its top edge flush with the top surface of the carriage. The stripper bar 67 corresponds in length and edgewise thickness to that of the knife 55 which latter, when the punch is operated, presses this bar downwardly in the die slot in opposition to the springs 66ᵃ, see Fig. 17. Upon the upstroke of the knife holder 53 after a shearing operation the plate 66 forces the bar 67 upward whereby to push the sheared strip of film upwardly out of the die slot.

Behind the knife 55 there is mounted on the knife holder 53, by means of an elongated angle bracket 68, a vertically movable presser bar 69, the bracket 68 being secured to the holder 53 by screws 68ᵃ, Fig. 13. The bar 69 is supported by bolts 70 which pass through clearance holes in the bracket 68 and are threaded into the bar, the bolts 70 having enlarged heads which are normally pressed downwardly against the upper side of the bracket 68 by springs 71 contained in vertical bores in the underside of the knife holder. The bottom face of the presser bar 69 is slightly beveled, as shown, so that when the punch is operated, see Figs. 14, 15 and 17, the forward edge of the bar adjacent to the rear cutting edge 56 of the knife will yieldingly press and hold a sheet of film F flatwise against the top surface of the carriage during the shearing operation.

To assure accurate alignment of the knife for entry into the die slot of the carriage, the knife is provided beyond its cutting ends with pilot extensions 72 which enter with a neat fit, and in advance of the cutting operation, the apertures 73 formed in U-shaped spacers 73ᵃ secured in the bed plate 63ᶜ and which constitute the opposite ends of the die slot. Forward movement of the carriage 63, to the dotted line position indicated in Fig. 16, is limited by engagement of the plate 66 with the front wall 65ᵃ of the opening 65 in the base 50. Rearward movement of the carriage is limited by the abutment 74 which is adjustable to stop the carriage with the pilots 72 of the knife exactly aligned with the apertures 73.

Adjustable means are provided for regulating the stroke of the punch whereby the depth of penetration of the knife into the die slot will result in lateral cuts made by the ends of the knife which are consistent in length with the point-size of the type on any line-strip to be severed from a sheet. To this end there is provided a stepped gauge 75 having teeth 76 formed on its underside and which is shiftable endwise in a cross channel 77 at the top of the upright frame 51, see Figs. 11, 12 and 13. For setting the gauge 75 there is provided a pinion 78 meshing with the teeth 76 and secured to a fore-and-aft shaft 79, the latter being rotatable in suitable bearings in the frame 51 and the cover plate 52ᵃ and extending forwardly through a vertically elongated aperture 80 in the knife holder 53. Secured to the forward end of the shaft 79 is a dial 81 bearing different point-size markings, and secured to the rear end of this shaft is a notched disk 82 cooperative with a conventional spring-ball detent, whereby through turning the dial 81 the gauge 75 may be shifted endwise and positively located in different adjusted positions. A stop screw 83 in a bracket secured to the top of the knife holder 53 limits the stroke of the punch by engagement against such step on the gauge 75 as may be aligned with the screw.

For utilizing the perforations in a sheet of film or paper taken from the film holder 16, whereby to locate and accurately align relative to the shearing knife 55 any line required to be severed out of the sheet, the carriage 63 is provided with two aligning bars 84, 85. These bars carry upstanding pins 84ᵃ, 85ᵃ, respectively, over which with the carriage drawn forward the perforations at opposite ends of any line may readily be engaged, the pins being spaced apart in correspondence with the spacing of the perforating punches 32, 33 previously described. The bars 84, 85 are shiftable endwise in guide channels formed in the die plates 63ᵃ, 63ᵇ to a depth such that the bars lie flush with the top surface of the die plates and the pins in the bars project above such surface. At their front ends the bars 84, 85 are rigidly connected to an L-shaped cross-tie 86 having a finger piece 86ᵃ (Figs. 11 and 20) whereby the connected parts may be shifted in unison to the extent necessary, first to align with the knife 55 (with slight clearance) the top of the characters in a line of type of any point-size and then the bottom of the characters in such line. By operating the punch at each such position of alignment there is produced a line-strip which is removable from the sheet by reason of the longitudinal cuts made above and below the line and the lateral cuts simultaneously made by the opposite ends of the knife. Figs. 25 and 25ᵃ to which detailed reference will later be made illustrate the cuts 104 and 105 made above and below and at the opposite ends of a line L¹, whereby to produce a removable line-strip bearing the type characters of this line which for simplicity is indicated by the dash outline shown within the cut lines.

In order that between operating strokes of the punch the bars 84, 85 may be shifted an extent corresponding to the point size of the type in any line there is provided the mechanism shown to best advantage in Figs. 18, 19 and 20. Thus, in the fixed cross member 87 at the front of the carriage 63 there is secured a forwardly projecting shaft 88 having pinned to its forward end a fixed disk 89. Encircling the disk 89 is a rotatable knurled ring 90 having point-size designations inscribed thereon and registrable selectively with an index mark on the disk 89, see Fig. 18. Secured within the ring 90 and to a sleeve 91 which rotatably bears on the shaft 88 are inner and outer disks 92, 94, the disk 92 carrying a plurality of different length pins 93 projecting inwardly therefrom and the disk 94 having depressions 95 on its outer face which align with the respective pins 93, the depressions 95 being cooperative with a conventional spring-ball detent 96 in the fixed disk 89. Shiftable endwise on the sleeve 91, by means of a slot and pin connection 97, is an outer sleeve 98 having a flanged end 99, the latter carrying a plurality of different length pins 100 projecting forwardly therefrom and similar in number and in length to opposed axially aligned pins 93 in the disk 92.

The length of different pairs of opposed pins in the disk 92 and the flange 99 is such as to present in the path of a tail extension 101 of the cross-tie 86 a gap commensurate with the point-size of the type for which the ring 90 is set. A spring 102 acting against the disk 92 and the flange 99 keeps these parts separated to the maximum extent for each setting of the ring 90. Another spring 103, Fig. 19, serves to urge the cross-tie 86 forwardly to hold its tail extension 101 against the particular pin 93 that stands in its path by virtue of the setting of the ring 90. Thus, assuming a 24-point setting for the ring 90, as indicated in Fig. 18, the gap between the then active pair of opposed pins 93, 100, is such as to allow the cross-tie 86 and in consequence the aligning bars 84, 85, to be shifted in unison from a forward position, after operating the punch to shear above and at the ends of a line of 24-point type, to a rearward position at which to again operate the punch to shear below such line. Such shifting is done manually by pressing inwardly on the finger piece 86ª in opposition to the spring 103 which latter, after the second stroke of the punch, serves to return the aligning bars and the film sheet engaged over the pins therein forwardly until the tail extension 101 again rests against the forward active pin 93.

With further reference to Figs. 18, 19 and 20, means are provided for altering the gap normally existing between an active pair of pins 93, 100, at different settings of the dial 91, thus to enable the bars 84, 85 to be shifted, between operating strokes of the punch, a distance sufficient to sever out line-strips which are wider (in a columnwise direction) than the point-size of the type in any line. The need for this arises by reason of the well known practice of "leading-out" between successive lines in a body of type matter, that is, opening up the space between lines, for better readibility, by using in the camera a line-space feed which is greater by one or several points than the point-size of the type. By enabling the bars 84, 85 to be shifted, between the two strokes of the punch, a distance equal to the type size plus the added "leading," and over-setting the stroke of the punch accordingly, there is avoided the chance of leaving between adjacent line-strips that may be severed out, a cross strip of film or paper that is so narrow and fragile (equal in width only to the amount of the "leading") as to be unstable and worthless as a guide in inserting a replacement line-strip.

Fig. 25ᵇ illustrates how, by oversetting the stroke of the punch to the extent of "leading" between the lines L¹ and L² the lateral end portions of the cuts 104 and 105 are considerably elongated over the showing in Fig. 25ª, that is, elongated to a point below the bottom of the type in these lines to the extent of the "leading" or widened space between them.

To enable alteration of the normal gap between an active pair of pins 93—100, whereby to compensate for "leading," that is, to sever line-strips wide enough to include different amounts of "leading" between lines, there is provided a wedge member W which is shiftable endwise between the flange 99 carrying the pins 100 and the rigid cross member 87 at the front of the carriage 63. A spring X urges the wedge W to the left, as viewed in Fig. 19, against one or another of the radially graduated faces of a manually rotatable vernier cam Y. With the vernier cam Y set at the zero position as indicated in Figs. 18 and 19, the wedge W holds the flange 99 and in consequence the pins 100 therein in normal spaced relation with respect to the pins 93, thus to enable the bars 84, 85 to be shifted only to the extent of the point-size of the type in a line to be severed from a sheet. Should it be desired to sever out a line-strip which is wider than the point-size of the type in a given line by the amount of line-space "leading," it is only necessary to set the vernier cam Y to the 1, 2, 3 or 4-point marking, whichever may apply. As a result the disk 99, under the urge of the spring 102, will respond to leftward movement of the wedge W (by its spring X) and in consequence the gap between the pins 93 and 100 will be such as to enable the bars 84, 85 to be shifted the required distance in excess of the point-size of the type.

*Procedures in using the two-stroke punch*

Two different procedures may be followed in producing removable faulty and correct line-strips with the aid of the foregoing two-stroke punch and universal shearing knife.

According to one procedure line-strips may be severed by the knife 55 so as to be temporarily retained to the sheet by tiny and easily fracturable webs at opposite ends of a severed strip. Such webs are indicated at 106 in Figs. 25 and 25ª wherein it will be seen that the lateral portions of the cut 104 made above the faulty line L¹ (represented in dash outline) fall short of intersecting the longitudinal cut 105 made below such line, thus leaving the tiny webs 106 by which the severed line-strip is held intact with the film sheet F. As already indicated, the cuts 104 and 105 are made with the perforations P¹ opposite the ends of the line L¹ engaged over the pins in the aligning bars 84 and 85, the latter being shifted rearwardly between the two strokes of the punch to the extent of the gap between the aligned pair of pins 94, 100 which correspond to the point-size of the type in the line L¹.

The retaining webs 106 result from the angle at which the bottom of the universal 36-point knife 55 is tapered, the sharpness of this angle being such that when the stroke of the punch is stopped by the gauge 75 the knife does not penetrate the die sufficiently deep to produce lateral cuts exactly equal in length to the point-size of type designated on the gauge setting dial 81. As will be evident, the angle of the bottom of the knife could be made flatter in order to produce lateral end cuts long enough to completely sever a line-strip from the sheet upon the second stroke of the punch.

However, according to another procedure, the sharply tapered knife 55 may be used to completely sever out a line-strip, that is to produce lateral end cuts long enough to completely detach a strip upon the second stroke of the punch. To accomplish this it is merely necessary to set the dial 81 to a point-size somewhat larger than the type in the line to be severed out (say at the 26-point mark for 24-point type) so that the lateral portions of the cut 104 made on the first stroke of the punch will be long enough to intersect the longitudinl cut 105 made on the second stroke. Obviously the lateral portions of the cut 105 opposite the ends of the line L² which is not required to be severed out of the sheet serve no useful purpose, yet they do no harm, because when a corrected line-strip severed from a "secondary" sheet is substituted for a faulty strip L¹ severed from a "primary" sheet, the useless lateral cuts 105 may be sealed by adhesive tape such as used in the manner later described for securing the substitute corrected line-strip in place in the "primary" sheet.

Either of the foregoing procedures may be followed according to desire or practice in a given shop. One advantage of leaving the severed strips temporarily retained to their respective "primary" and "secondary" sheets is that the sheets may be transported about or accumulated for exchange of faulty strips for corrected strips by a special workman at an assigned place and time, the attached strips then aiding the worker in quickly identifying the complementary strips to be exchanged. If on the other hand the practice should be to identify faulty and corrected lines by a numbering system or the like; or to replace faulty lines with corrected lines sequentially upon detection, the procedure of completely shearing out the faulty and corrected line-strips by over-setting the gauge 75 may be preferred.

The action of the universal 36-point knife 55 and associated parts of the punch under specific settings of the gauge 75 is illustrated in Figs. 14, 15 and 25. Thus, in Fig. 14 where the gauge setting dial 81 may be assumed to be set for 12-point type, the knife has penetrated the 36-point die-opening to the extent that its ends produce lateral cuts just short of 12-points in length and thus leave the tiny webs 106 as seen in Fig. 25. In Fig. 15 where the dial 81 may be assumed to be set for 36-point type, the knife has penetrated the 36-point die-opening to the extent that its ends produce lateral cuts just short of 36-points, thus leaving the tiny webs 107 which retain to the film sheet F the severed 36-point line-strip L³ as seen in Fig. 25. In both instances it will be seen that the presser bar 69 presses the film sheet F firmly down against the rear carriage die-plate 63ᵇ; that penetration of the knife into the die opening results in downward deflection of the film strip which is being sheared and in depression of the stripper bar 67; that upon withdrawal of the knife out of the die the stripper bar 67 serves to force the deflected strip of film upwardly into its original flat plane with respect to the film sheet. Further, it will be apparent that should the gauge 75 be over-set, whereby to avoid leaving the retaining webs 106 or 107, the stripper bar 67 would then operate to force the completely severed line-strip upwardly into the plane of the film sheet where such severed strip may be readily picked out by the fingers or with the aid of tweezers and discarded.

Fig. 26 shows the opening O¹ left in the film sheet F upon removal of the faulty 12-point line-strip L¹ of Fig. 25, by breaking the tiny retaining webs 106; also the opening O² left upon removal of the faulty 36-point line-strip L³ of Fig. 25 by breaking the tiny retaining webs 107. Obviously the openings O¹ or O² would also result if the gauge 75 should be over-set, whereby to eliminate the retaining webs 106 or 107.

*The single stroke punch with exchangeable knives*

Figs. 21, 22 and 23 illustrate the alternative arrangement of the punch wherein faulty and corrected line-strips may be completely severed from a "primary" or a "secondary" sheet by a single operating stroke. To this end the punch is equipped with exchangeable knives which alone or in selected pairs correspond in thickness (plus a slight excess to just clear the top and bottom of the type characters) to the point-size of the type in a line to be severed out, and the stroke-limiting gauge 75 is set to permit full penetration of both edges and the ends of the knife through the sheet and the die-slot upon a single stroke of the punch.

To accommodate such knives the carriage 63 is provided, as seen in Figs. 21, 22 and 23, with a front die plate 108 which is adjustable fore-and-aft relative to the fixed rear die plate 109, whereby to provide a die slot suited to knives differing in thickness and which may be selectively attached to the knife holder 53. An adjusting screw 110 threaded about centrally into the front edge of the die plate 108 is provided with a shoulder 111 and a collar 112 bearing against the opposite faces of the rigid cross member 87, whereby upon turning the screw the die plate 108 may be shifted fore-and-aft on the bed plate 63ᶜ. To permit such shifting of the die plate 108, the stripped bar 67 formerly provided between the front and rear die plates is, of course, omitted.

To adjust the die plate 108 relative to an attached knife, the knife holder is momentarily lowered, as in Fig. 21, thus to position the knife between the front and rear die plates while turning the adjusting screw 110 until, in the manner of operating a micrometer, the operator "feels" the setting. Fig. 21 shows the die plate 108 adjusted forwardly to provide clearance for attaching a desired knife, and Fig. 22 shows this die plate shifted inward into engagement with the attached knife 113.

Further in respect to this embodiment of the punch, it will be apparent that since the selected shearing knife (or pair of knives) is exactly suited to the point-size of the type in a line to be severed out and is always allowed to fully penetrate the die in a single stroke of the punch, there is no need for shifting the aligning bars 84, 85 over the pins of which are engaged the perforations opposite the ends of the line-strip to be removed. It is only necessary that the dial 91 be initially set to the point-size of the type in the line to be sheared out, whereupon the spring 103 acting on the cross tie 86 will position the bars 84, 85 in correspondence with the active pin 93. As a result, the top and bottom of the characters in such line are concurrently aligned with the front and rear cutting edges respectively of the knife. Fig. 22ᵃ illustrates the clean-cut opening V left in the film sheet F after a single shearing operation by the knife 113 completely severs out the line-strip. With this embodiment of the punch a line-strip wider than the point-size of the type by the amount of "leading" between lines may be severed out simply by using knives which alone or in selected pairs are sufficiently thick to account for the amount of "leading."

As seen in Figs. 21 and 22, a drawer 114 is provided in the base 59 of the punch for receiving the severed-out line-strips, and the inner face of the front die plate 108 is cut back as at 108ª to widen the die slot, thus to permit the strips to drop freely into the drawer. Further, as seen in Fig. 23, the rear die plate 109 is formed with forwardly extending portions 115, 116 which neatly fit into complementary slots formed in the adjustable die plate 108, thus providing for accurate guidance of the latter and also of the aligning bars 84, 85 which are embedded in the extended portions 115, 116. A stop pin 117 limits forward movement of the carriage 62, whereby to position the latter for convenient placement of the perforations in a film sheet over the pins in the bars 84, 85, and the adjustable stop 74 limits rearward movement of the carriage to the point where the rear cutting edge of the knife 113 aligns with the front edge of the fixed die plate 109.

In connection with the openings $O^1$, $O^2$, and V left in a sheet after removal of line-strips severed out by the punch in either of its embodiments, it will be observed that such openings terminate short of the perforations in the marginal edges of the sheet, thus leaving the sheet intact and also preserving the perforations for use as register means in performing subsequent trimming and make-up operations such as hereinafter described.

*Steps and apparatus involved in executing corrections*

From the foregoing description it will be evident that for each faulty line severed out of an original or "primary" sheet by utilizing the perforations made therein while the sheet is in the film holder 16, there is prepared on a "secondary" sheet a substitute corrected line with similar perforations which are used to severe such line from this sheet. Also, it will be evident that faulty and corrected lines are severed from their respective sheets by operating the line-strip punch, in either of its embodiments, at the same settings in respect to the point-size of the type in the corresponding lines. Therefore each corrected line-strip will be of the exact size of the opening left in the "primary" sheet after removal therefrom of the corresponding faulty line-strip. Accordingly, the longitudinal and lateral end walls of the opening left in the "primary" sheet by removal of the faulty line-strip provide physical abutments against which the corresponding edges of the substitute corrected line-strip may be accurately positioned, whereby to assure perfect vertical and horizontal alignment of the type in the substitute line with the type in adjacent unaltered lines on the sheet undergoing correction.

*The vacuum box for line-strip insertions*

As an aid in executing corrections, that is, placing corrected line-strips into the openings in a "primary" sheet where faulty line-strips have been removed, the invention provides the illuminated vacuum box 118 illustrated in Figs. 24 and 27 to 33 inclusive. As best seen in Figs. 27, 28 and 29, the box 118 is provided internally with a lower hollow compartment 119 for accommodating in suitable sockets 120 a pair of elongated lamps 121. Above and separated from the light compartment 119 by a transparent plate 122 are several vacuum chambers 123, 124 and 125 which are isolated from one another by transparent partitions 126 and 127, the latter being suitably embedded edgewise in the upright side walls of the box and in the bottom plate 122, and also in a transparent top cover plate 128 which is secured in place as by the longitudinal side strips 129, 130.

The vacuum chambers 123, 124 and 125 communicate individually with a vacuum passage 131 by means of outlets 132, 133, 134 in the intermediate wall 135 between this passage and the respective chambers, the passage 131 having an opening 136 for connection thereto of a suitable exhaust pipe. To exhaust air from one or more of the chambers there is provided a valve bar 137 having a knob 138 by which it may be slid fore and aft (in a suitable groove in the wall 135) while maintained in tight engagement against the wall 135 by means of rollers 139 mounted on springy angle brackets 140. The valve bar 137 is provided with apertures 141 and 142 which, in the innermost position of the bar as shown in Fig. 27, are out of register with the respective outlets 132, 133 and thus enable the bar to prevent communication of the chambers 123, 124 with the vacuum passage 131. At the same time the inner end of the valve bar overlies the outlet 134 and thus prevents communication of the chamber 125 with the vacuum passage 131.

Figs. 30, 31 and 32 show how one or more of the vacuum chambers may be progressively brought into communication with the passage 131 by sliding the valve bar 137 forwardly to different positions determined by engagement of the spring detent 143 in suitable locating notches formed in a member 144 secured to the bar. Thus, in the first forward position of the valve bar as seen in Fig. 30 only the outlet 134 is uncovered, thus enabling a vacuum to be created in the chamber 125. In the second forward position of the valve bar as seen in Fig. 31, the outlets 133 and 134 are both uncovered, the aperture 142 registering with the outlet 133 and thus opening the corresponding chambers 124 and 125 to the vacuum passage 131. In the third forward position of the valve bar as seen in Fig. 32, the apertures 141 and 142 in the bar both register with the respective outlets 132 and 133, whereby all three of the chambers are open to the vacuum passage 131 for exhaustion therefrom of air.

The lamps 121 are connected by a cable 145 to a suitable source of current which may be cut off and on by means of a switch 146. Any conventional valve means, not shown, may be provided for controlling the vacuum exhaust line connected at 132.

As clearly shown in Figs. 24, 27 and 28, the transparent top cover plate 128 of the vacuum box is provided with a plurality of rows of perforations 147 which communicate with each of the vacuum chambers. Accordingly, when a sheet of film F is laid upon the cover of the box, as shown in Fig. 24, such portions thereof as may overlie one or more of the vacuum chambers from which air is exhausted due to manipulation of the valve bar 137 are susceptible to being drawn down firmly against the cover.

The facility afforded by the vacuum box 118 in inserting corrected line-strips in the openings left in a "primary" sheet by removal of faulty line-strips will be evident from Fig. 24. Thus, when a corrected line-strip 148 is directed by the fingers toward the opening 149, the rush of air downwardly through the perforations exposed through this opening acts to draw the inserted line-strip down into place. Should this strip be inaccurately directed toward the opening it may be released from the fingers and easily maneuvered into place while the vacuum still acts to draw it downwardly and at the same time to hold the film sheet flat and steady.

Illumination by the lamps 121 serves to materially aid the worker in positioning the line-strip and also in reading it as a final check upon whether it is the right strip for the particular opening. Further, since the opening 149 left in the "primary" sheet by removal therefrom of a faulty line is exactly suited in size and location for receiving the corrected line-strip to be inserted, the longitudinal and lateral end walls of the opening 149 furnish convenient abutments for quickly shifting the inserted strip exactly into place and flatwise into the plane of the film sheet.

Upon registering the inserted corrected strip 148 in the opening 149 the strip may be secured to the film sheet, as by applying small tabs of Scotch tape crosswise at the opposite ends or an overlying longitudinal strip of such tape, as designated S in Fig. 24, being careful only to avoid covering the perforations. It will be understood that in subsequent steps performed prior to producing a printing plate bearing the type matter on this corrected sheet, any "ghost-lines" which might result from the edges of the adhesive tabs or strips either disappear or are eliminated, according to different known procedures which may be followed.

The trimming board

According to the invention there is provided a trimming board, Fig. 34, which is so constructed as to enable the perforations punched in a sheet while in the film holder 16 to be utilized for aligning purposes while cutting off and trimming portions of the sheet to such head-space, foot-space and side margin dimensions as may be specified or required in respect to type lines or groups thereof in order to make up columns or pages.

As evident, the trimming board illustrated resembles in general a standard photographer's trimming board with certain modifications. Thus, it comprises the base 150 having a flat table 151 and also the customary hinged cutting knife 152. For present purposes the usual inch scale across the top is replaced by a printer's pica scale 153 with ½ em graduations.

The table 151, preferably made of metal, is provided with grooves 154 at each ½ em scale mark, except for the first 6 picas which is merely scored at ½ em intervals, as at 155. The grooves and the scores are all parallel to the cutting edge 156, and the width of the grooves is equal to the diameter of the perforations in the film sheet.

The purpose of the grooves 154 is to accommodate aligning pins 157, Fig. 41, having stem portions 158 which fit the film perforations and the grooves with just enough clearance to enable inserting and removing the pins axially without binding. The score marks provide a gauge for aligning purposes when trimming for head-space and foot-space.

To hold a sheet of film or paper firmly down adjacent to the cutting edge of the board, to prevent the sheet from creeping while being cut, there is provided the clamping arm 159. As shown, this arm is provided with a soft rubber facing 160 which yieldingly engages a sheet of film or paper when the arm is lowered into locking engagement with a suitable spring latch 161.

As apparent, the grooves 154 and score marks 155 are visible for aligning purposes through transparent film positives but not through film negatives and paper. Accordingly there is provided for use with negatives and paper the flexible transparent overlay member 162 shown in Fig. 36. This member is 6 picas wide and like the first 6 picas of the table 151 it is scored at ½-pica intervals. When film negatives or paper are to be dealt with the member 162 is inserted in the undercut 163 beneath the scale 153, then anchored at its upper end by a pin 164, Fig. 35 and at its lower end by a similar pin, the latter pin passing through a hole 165 which aligns with a hole 166 in the table 155. At its forward end the member 162 is suitably secured to a metal bar 167 which when seated on the ledge 168 keeps the member slightly elevated off the surface of the table. Such elevation provides clearance for shifting the film or paper about on the table to align type lines visible through the overlying member with the score mark thereon appropriate to the trimming requirements.

In using the trimming board the worker may proceed in various ways according to convenience and expediency, it being preferable in all cases however to lay the sheet on the board with the emulsion side up, thus to avoid scratching when the sheet is shifted about. For present purposes and by way of illustration, let it be assumed that the groups G and $G^1$ of type matter on the film sheet F of Fig. 37 are to be detached from the sheet to provide individual units intended for subsequent association side by side as parts of a two-column printed page for a given job. Further, let it be assumed that the "make-up" calls for a 2-pica head-space and foot-space to be left above and below these separate groups of type and for a 5-pica gutter or setwise spacing between columns. Also, it may be pointed out that in Figs. 37 to 48 inclusive which relate to trimming and make-up operations, the film width, line length and dimensions referred to are drawn to one-half scale for convenience of illustration, whereas the trimming and make-up boards are drawn to full scale.

Preliminary to detaching the type groups G and $G^1$ from the film sheet F of Fig. 37, the first logical step is to trim for the desired 2-pica head-space above the type group G. To do this the worker simply shifts the sheet until the tops of the characters in the first line a appear to be in reasonably close alignment with the 2-pica score mark. Then, in order to positively fix the alignment accurately and in parallelism with the cutting edge of the board, he inserts pins 157 in such pair of perforations P (opposite any line on the sheet) as are observed to coincide with a groove 154. Such condition of the parts preparatory to operating the knife is shown in Figs. 38 and 40, and the dash line c in Fig. 38 indicates the trim line or cut made by the knife.

To now detach the type groups G and $G^1$ as individual units, the pins 157 are removed and the sheet shifted to the right until the tops of the characters in the first line $b$ of the group $G^1$ appear to align with the 2-pica score mark. Then, upon inserting the pins 157 as before to fix the alignment, a cross-cut will be made on the line $c^1$. Such cut trims the group $G^1$ for the desired 2-pica head-space and at the same time detaches the group G as a separate unit but requiring a further cut, as later described, to trim for the desired 2-pica foot-space.

Upon again removing the pins the sheet may be shifted further to the right until the last line $b^1$ of the group $G^1$ is at least 2 picas beyond the cutting edge of the board, thus to make a cross-cut between the groups $G^1$ and $G^2$ which will leave on the former group, when detached, enough blank film for subsequent trimming to the desired 2-pica foot-space. With the type group $G^1$ already shifted off the board it will be apparent that the score marks can not be used to gauge the amount of foot-space. Therefore, the procedure is simply to hold a loose pica scale over the sheet and observe roughly when the last line $b^1$ is something in excess of 2 picas to the right of the cutting edge, then insert pins 157 as before and cut. This will detach the type group $G^1$ which, like the previously detached group G, may later be trimmed accurately for foot-space in the manner now to be described.

The detached units bearing the respective type groups G and $G^1$ may now be trimmed for the desired 2-pica foot-space by either of two procedures, one of which is shown in Fig. 39 and the other in Fig. 47, both of which require turning the film unit 180 degrees whereby to use the score marks 155 as a means for gauging the foot-space measurement.

The procedure shown in Fig. 39 is useful whenever it is possible to find, in the unit to be trimmed, a pair of perforations which register with a groove 154 upon aligning the bottoms of letters in the last line with the score mark appropriate to the desired amount of foot-space. As shown in Fig. 39, the unit bearing the type group G answers this condition, the pins 157 being inserted in a groove 154 with the bottoms of the letters in the last line $a^1$ aligned with the 2-pica score mark. Accordingly, a cross-cut made on the line $c^2$ produces the detached unit shown in Fig. 42 having the desired 2-pica space above and below the group of type G. The unit bearing the type group $G^1$ also responds to the above condition and is shown in Fig. 43 after being detached and trimmed for the desired 2-pica foot-space.

The procedure shown in Fig. 47 is useful when dealing (a) with a unit such as $F^1$ which carries only a line or two of type and is too short even to overlie the grooved portion of the board and (b) with a unit which might overlie even a considerable portion of the grooves, but is devoid on such overlying portion of any type lines and thus of any perforations. In such cases which obviously preclude using the pins 157 for aligning purposes, the unit is pushed upwardly into the undercut 163 beneath the scale 153, see Figs. 34, 35. Here the right hand edge $e$ of the unit abuts against the vertical shoulder beneath the scale and serves to squarely align the unit for trimming at the desired distance, for example on the dash line $f^1$, below the bottoms of the characters in the last line $f$. As apparent, the unit F shown in Fig. 39 might also be trimmed for the desired 2-pica foot-space by following the procedure indicated in Fig. 47 and thus without using the pins 157.

It now remains to trim the film units of Figs. 42 and 43 to the width required for making them up side by side with the desired 5-pica setwise space or gutter between them. As in trimming for head and foot-space, the perforations originally made in the film holder 16 and still preserved are again utilized as the basic means for locating the respective units for side or marginal trim.

For illustrative purposes in explaining the procedure for marginal trim, let it be assumed that the lines of type matter comprising the type groups G and $G^1$ are 10 picas long (actually 20 picas if drawn to full scale). This means that with the desired 5-pica gutter between these groups when made up side by side, see Fig. 46, the total distance from the starting margin of lines in the group G to the corresponding margin of lines in the group $G^1$ must be 15 picas. And since the distance between the perforations and the line-starting margin is a constant and thus the same for the lines of both type groups, the perforations when used, as they are, for locating the film units side by side as in Fig. 46 will also stand 15 picas apart.

To trim the group G unit to the reduced width required to meet this 15-pica dimension and thus avoid overlap when it is placed beside the group $G^1$ unit, the perforations and pins 157 are used in the manner shown in Fig. 44, wherein the pins inserted in any two perforations insure that the cut to be made will be perfectly square with the already trimmed upper and lower edges as well as with the type lines. As seen, the pins are inserted in the 14½-pica groove whereby a cut on the line $x$ will result in a unit measuring 14½ picas from the left hand perforations to the trimmed right hand edge. The G unit so trimmed to 14½-pica width is indicated in Fig. 46.

The 14½-pica measurement is arrived at by using a simple formula applicable universally to the present system for calculating marginal trim in multiple column make-up work, namely; length of line (10 picas) plus total gutter (5 picas) minus ½ pica. The ½-pica deduction is made in order that the $G^1$ unit may be left wide enough at its left edge to preserve intact the adjacent perforations, it being apparent that if the group G unit were trimmed to 15 picas it would then be necessary, in order to obtain the desired 5-pica gutter, to trim a narrow strip from the left edge of the group $G^1$ unit on a line that would remove the perforations or at least cut through them.

The left edge of the unit bearing the type group $G^1$ must now be trimmed squarely and on a line such that from its left edge to the adjacent perforations it measures no more than ½ pica, this being the amount deducted from the group G unit by the foregoing formula. The fact is that the spacing chosen for the punches in the film holder and thus the spacing of the perforations in the film is preferably such as to leave somewhat less than ½ pica after trimming. The object of this is to provide, as seen in Fig. 46, a slight gap between the units when arranged side by side so that the respective units will be perfectly free to shift vertically and thus bring corresponding lines into horizontal alignment, as hereinafter pointed out. To accomplish this the group $G^1$ unit is turned 180 degrees to present its left hand edge to the cutting edge of the trimming board and pins 157 for squaring the alignment are inserted in the 16½-pica groove, whereby the trim cut is made on the line $y$.

The 16½-pica groove (the 33-pica groove if the film were drawn to full scale) is used for alignment purposes in making the cut on the line y because this measure is sufficiently greater by about ⅓ pica than the spacing between perforations (about 32⅔ picas) at the opposite ends of lines to insure leaving a solid body of material between the perforations and the trimmed edge, thus preserving the perforations intact for subsequent use with the make-up table.

*The make-up table*

As its name implies, the make-up table is used for assembling related units or blocks of type matter, trimmed to specified dimensions, into page or column forms from which may be made the final printing plate. To enable the perforations made in the film holder 16 again to be utilized in the make-up procedure, the invention provides the make-up table of Figs. 48 and 49.

As shown, the make-up table comprises an airtight box-like base 169 having a transparent top plate 170 which is preferably grained or frosted and is illuminated from below by suitable light tubes 171 mounted within the base. The top plate 170 is provided across its entire width with grooves 172 spaced ½ pica apart and similar to the grooves in the trimming board. Holes 173 through certain grooves and at suitably spaced intervals along the grooves communicate with the vacuum chamber 174 which connects with an exhaust line through the outlet 175.

Across the upper edge of the table and flush with the top plate is a pica scale 176. Along the left side of the table and also flush with the top plate is a scale 177 having pica graduations along its inner edge and inch graduations along its outer edge, such graduations providing the worker with gauging means suited to any page or make-up specifications.

To arrange the trimmed units bearing the type groups G and G¹ into the 2-column form shown in Fig. 46, the make-up table is used in the manner indicated in Fig. 48.

Thus, referring to Fig. 48, the group G unit (trimmed to 14½ picas as in Fig. 44) is laid on the table at any convenient distance from its upper edge, then fixed squarely by two pins 157ᵃ passed through any two perforations and into the "zero" groove as indicated on the scale 176. The group G¹ unit (trimmed to 16½ picas as in Fig. 45) is then laid on the table at the right of the group G unit, then fixed squarely by two pins 157ᵃ passed through any two perforations at its left edge and into the 15-pica groove as indicated on the scale 176. The pins 157ᵃ are similar to the pins 157 of Fig. 41 except that the heads are somewhat smaller, thus to avoid interference with the T-square 178.

As evident, the inserted pins 157ᵃ anchor the respective G and G¹ units positively against displacement in a setwise direction and their insertion in grooves spaced 15 picas apart insures the desired 5-pica gutter between the type lines as seen in Fig. 46. However, since the grooves 172 allow the type-bearing units and the inserted pins to be shifted bodily in a direction longitudinally of the grooves, the units may be relatively adjusted until the tops or the bottoms of the letters in any corresponding setwise lines on the respective units fall in horizontal alignment, as observed by aligning with the T-square 178.

Once such horizontal alignment is attained the vacuum line is opened whereby to firmly hold the film units in adjusted position and the T-square is removed, whereupon a piece of transparent adhesive tape TA, Fig. 46, may be applied to bind the adjacent units together in their properly related positions. Then, upon turning off the vacuum and withdrawing the pins 157 the sealed-together units may be lifted off the make-up table as a single unit. As indicated in Fig. 46, the G and G¹ units may be attached to other similar units by an adhesive tape TB, such units being associated setwise and columnwise on the make-up table, in the manner already described, prior to such attachment.

I claim as my invention:

1. A method of preparing a form from which a printing plate can be made, said form comprising lines of type matter of the same or different type sizes produced on a film or paper sheet in columnwise succession in a photocomposing machine, which comprises perforating the sheet marginally within its edges and opposite the ends of each line when produced thereon and while the sheet is fixed on the optical projection axis for the respective lines; utilizing the perforations related to any faulty line to locate such line relative to a punch and punching from the sheet, between said perforations, a rectangular strip bearing the faulty line; utilizing perforations similarly made and related to a corrected line produced on a secondary sheet to locate such line relative to the punch and punching as aforesaid from this sheet a rectangular strip of the same size bearing the corrected line; inserting the corrected line-strip in the rectangular opening in the first sheet where the faulty line-strip is removed by utilizing the walls of said opening as abutments for locating the inserted line-strip in the plane of said sheet, and securing the inserted line-strip to said sheet.

2. A method of preparing a composite form from which a printing plate can be made, said form comprising lines of type matter of the same or different type sizes produced on a film or paper sheet in columnwise succession in a photocomposing machine, which comprises, perforating the sheet marginally within its edges and opposite the ends of each line when produced thereon and while the sheet is fixed on the optical projection axis for the respective lines; utilizing the perforations opposite such line on the sheet as by selection is found to position another line thereon parallel to and spaced from a trimming knife in accordance with desired end margin dimensions, and operating the knife to detach from the sheet a portion trimmed to such dimensions and bearing said other line or a group of lines of which it is a part; utilizing any two perforations at one edge only of said detached portion to dispose the line or lines normal to the trimming knife and spaced therefrom in accordance with desired side margin dimensions for said line or lines, and operating the knife to trim to such dimensions; utilizing the perforations adjacent to the starting margin of any two lines on different detached portions to relatively align the type lines thereon marginally and crosswise in single or multiple column order, and securing the so aligned portions together to provide the composite form from which to make a printing plate.

3. A method of preparing a composite form from which a printing plate can be made, said form comprising lines of type matter of the same or different type sizes produced on a film or paper sheet in columnwise succession in a photocomposing machine, which comprises, perforating the sheet marginally within its edges and opposite the ends of each line when produced thereon and while the sheet is fixed on the optical projection axis for the respective lines; utilizing the perforations related to any faulty line to locate such line relative to a punch and punching from the sheet, between said perforations, a rectangular strip bearing the faulty line; utilizing perforations similarly made and related to a corrected line produced on a secondary sheet to locate such line relative to the punch and punching as aforesaid from this sheet a rectangular strip of the same size bearing the corrected line; inserting the corrected line-strip in the rectangular opening in the first sheet where the faulty line-strip is removed by utilizing the walls of said opening as abutments for locating the inserted line-strip in the plane of said sheet, then securing the inserted line-strip to the sheet; detaching from the sheet portions bearing a line or group of lines by utilizing the perforations opposite a line on the sheet which by selection is found to position a line on a portion to be detached parallel to and spaced from a trimming knife in accordance with desired head and/or foot-space dimensions for the detached portion, and operating the knife to detach portions trimmed to such dimensions; utilizing any two perforations at one edge only of the so detached and trimmed portions to dispose the line or lines thereon normal to the trimming knife and spaced therefrom in accordance with desired side margin dimensions for said line or lines, and operating the knife to trim to such dimensions; utilizing any two perforations in one margin only of said trimmed portions to relatively align the type lines thereon marginally and crosswise in single or in multiple column order, and securing said aligned portions together to provide the composite form from which to make a printing plate.

4. A method of preparing a form from which a printing plate can be made, said form comprising lines of type matter of the same or different type sizes produced on a film or paper sheet in columnwise succession in a photocomposing machine, which comprises, perforating the sheet marginally within its edges and opposite the ends of each line when produced thereon and while the sheet is fixed on the optical projection axis for the respective lines; utilizing the perforations related to any faulty line to locate first the tops and then the bottoms of the characters in such line relative to a punch and to shift the sheet to fix such locations in accordance with the point-size of the type in the line and punching from the sheet, between said perforations, a rectangular strip bearing the faulty line; utilizing in like manner perforations similarly made and related to a corrected line of the same type size but produced on a secondary sheet, and punching from said sheet a rectangular strip bearing the corrected line and of the same size as the strip bearing the faulty line; inserting the corrected line-strip in the rectangular opening in the first sheet where the faulty line-strip is removed by utilizing the walls of said opening as abutments for locating the inserted line-strip in the plane of said sheet; securing the inserted line-strip to said sheet and making the resulting corrected sheet into a form from which a printing plate can be made.

5. A method of preparing a form from which a printing plate can be made, said form comprising lines of type matter of the same or different type sizes produced on a film or paper sheet in columnwise succession in a photocomposing machine, which comprises, perforating the sheet marginally within its edges and opposite the ends of each line when produced thereon and while holding the sheet fixed relative to the optical axis upon which the respective lines are projected; utilizing the perforations related to any faulty line to position first the tops and then the bottoms of the characters in such line in crosswise alignment with one longitudinal edge of a shearing knife and to shift the sheet between such positions of alignment, and operating the knife in each such positions to shear the sheet longitudinally above and below the type characters and simultaneously by the ends of the knife to shear the sheet laterally from the ends of said longitudinal shearings and between the opposed perforations to shear out a rectangular strip bearing the faulty line; utilizing in like manner perforations similarly made and related to a corrected line produced on a secondary sheet, and operating the punch to shear out a rectangular strip of the same size bearing the corrected line; removing from the firstmentioned sheet the sheared-out rectangular strip bearing the faulty line and removing from the secondary sheet the sheared-out rectangular strip bearing the corrected line; inserting the corrected line-strip in the rectangular opening in the first sheet where the faulty line-strip is removed by utilizing the walls of said opening as abutments for locating the inserted line-strip in the plane of said sheet; securing the inserted line-strip to said sheet, and making the resulting corrected sheet into a form from which a printing plate can be made.

HERMAN R. FREUND.

References Cited in the file of this patent

UNITED STATES PATENTS

| Number | Name | Date |
|---|---|---|
| 1,207,506 | Cornwall | Dec. 5, 1916 |
| 1,481,332 | Stock | Jan. 22, 1924 |
| 1,563,045 | Schaffer | Nov. 24, 1925 |
| 1,808,320 | Schaffer | June 2, 1931 |
| 1,865,947 | Novick | July 5, 1932 |
| 1,975,439 | Uher | Oct. 2, 1934 |
| 2,036,000 | Uher | Mar. 31, 1936 |
| 2,184,546 | Collins | Dec. 26, 1939 |
| 2,190,188 | Landsiedel | Feb. 13, 1940 |
| 2,220,300 | Tathwell | Nov. 5, 1940 |
| 2,338,489 | Campbell | Jan. 4, 1944 |
| 2,470,291 | Collins | May 17, 1949 |
| 2,539,609 | Buckingham | Jan. 30, 1951 |